(12) United States Patent
Motomura et al.

(10) Patent No.: US 7,609,955 B2
(45) Date of Patent: Oct. 27, 2009

(54) IMAGE TAKING DEVICE, PORTABLE TERMINAL DEVICE, IMAGE TAKING METHOD, AND PROGRAM

(75) Inventors: Hideto Motomura, Nara (JP); Katsuhiro Kanamori, Nara (JP)

(73) Assignee: Panasonic Corporation, Osaka (JP)

( * ) Notice: Subject to any disclaimer, the term of this patent is extended or adjusted under 35 U.S.C. 154(b) by 110 days.

(21) Appl. No.: 11/911,069

(22) PCT Filed: Oct. 13, 2006

(86) PCT No.: PCT/JP2006/320499

§ 371 (c)(1),
(2), (4) Date: Oct. 9, 2007

(87) PCT Pub. No.: WO2007/060794

PCT Pub. Date: May 31, 2007

(65) Prior Publication Data

US 2009/0136223 A1 May 28, 2009

(30) Foreign Application Priority Data

Nov. 22, 2005 (JP) ............................. 2005-337839

(51) Int. Cl.
*G03B 17/00* (2006.01)
*G03B 3/00* (2006.01)
(52) U.S. Cl. .......................................... 396/77; 396/89
(58) Field of Classification Search .................. 396/77, 396/80, 82, 87, 89, 104, 131; 348/345, 348, 348/349

See application file for complete search history.

(56) References Cited

U.S. PATENT DOCUMENTS 4,774,401 A * 9/1988 Yamada et al. ........... 250/201.2

(Continued)

FOREIGN PATENT DOCUMENTS

JP        4-70899        3/1992

(Continued)

OTHER PUBLICATIONS

International Search Report issued Jan. 23, 2007 in the International (PCT) Application of which the present application is the U.S. National Stage.

(Continued)

*Primary Examiner*—Rodney E Fuller
(74) *Attorney, Agent, or Firm*—Wenderoth, Lind & Ponack, L.L.P.

(57) ABSTRACT

An image taking device has a multifocal lens which changes its focal length to change the image taking area on a subject from which an image is to be taken by an image pickup sensor, a distance sensor for measuring the distance to the subject, an image taking distance buffer unit for temporarily storing the image taking distance measured at a past time, a focal length computation unit which computes the focal length of the multifocal lens on the basis of the image taking distance at the present time measured by the distance sensor and the image taking distance supplied from the mage taking distance buffer unit, and a focus control unit which controls the focal length of the multifocal lens so that the focal length of the multifocal lens equals the focal length computed by the focal length computation unit.

23 Claims, 23 Drawing Sheets

U.S. PATENT DOCUMENTS

| | | |
|---|---|---|
| 6,853,401 B2 | 2/2005 | Fujii et al. |
| 2004/0130651 A1 | 7/2004 | Wakashiro |

FOREIGN PATENT DOCUMENTS

| | | |
|---|---|---|
| JP | 6-315144 | 11/1994 |
| JP | 2001-281520 | 10/2001 |
| JP | 2002-209134 | 7/2002 |
| JP | 2003-195145 | 7/2003 |
| JP | 2003-348418 | 12/2003 |

OTHER PUBLICATIONS

"*Digital Single-Lens Reflex Camera, \*istDA, Instructions for use*", PENTEX Corporation, p. 48.

\* cited by examiner

FIG. 1A
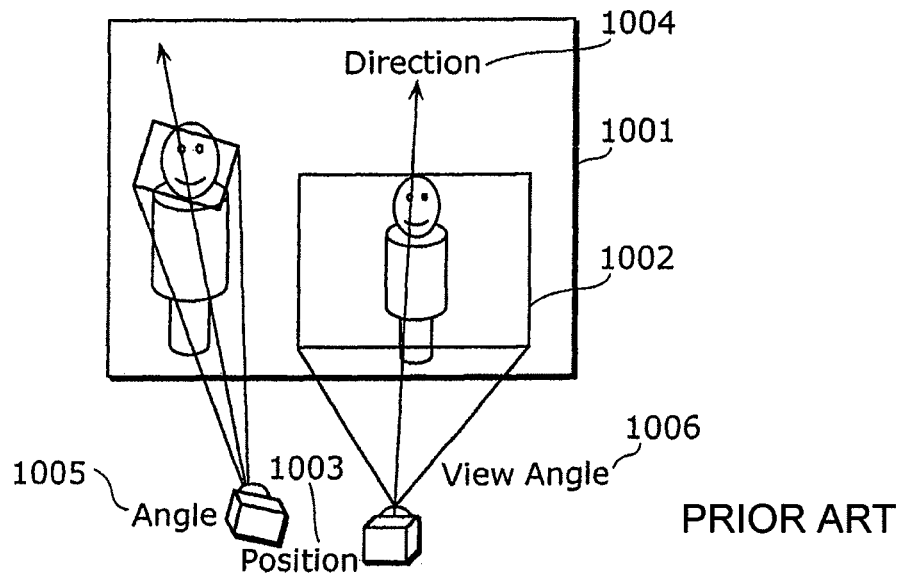
PRIOR ART
FIG. 1B
| Position | Tracking, Booming, Dollying |
| --- | --- |
| Direction | Panning, Tilting |
| Angle | Rolling |
| View Angle | Dollying, Zooming |
1007
PRIOR ART
FIG. 1C
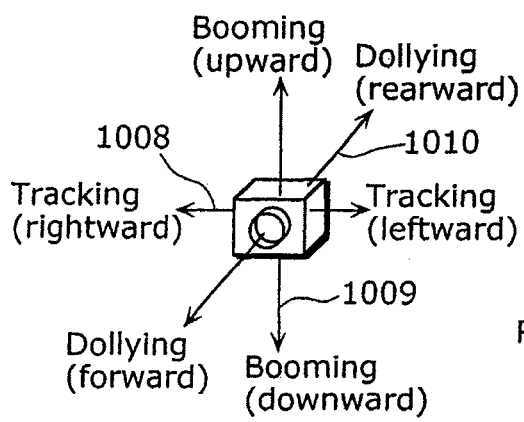
PRIOR ART
FIG. 1D
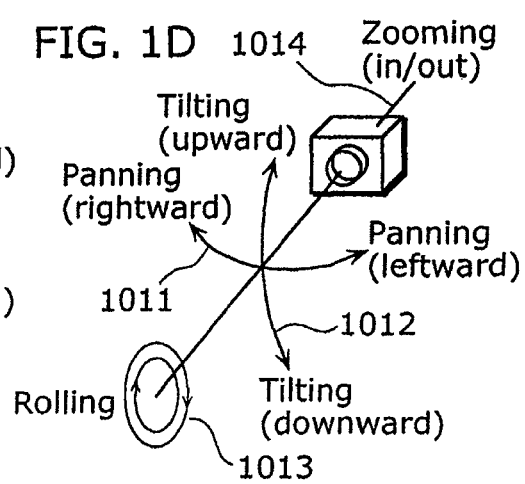
PRIOR ART

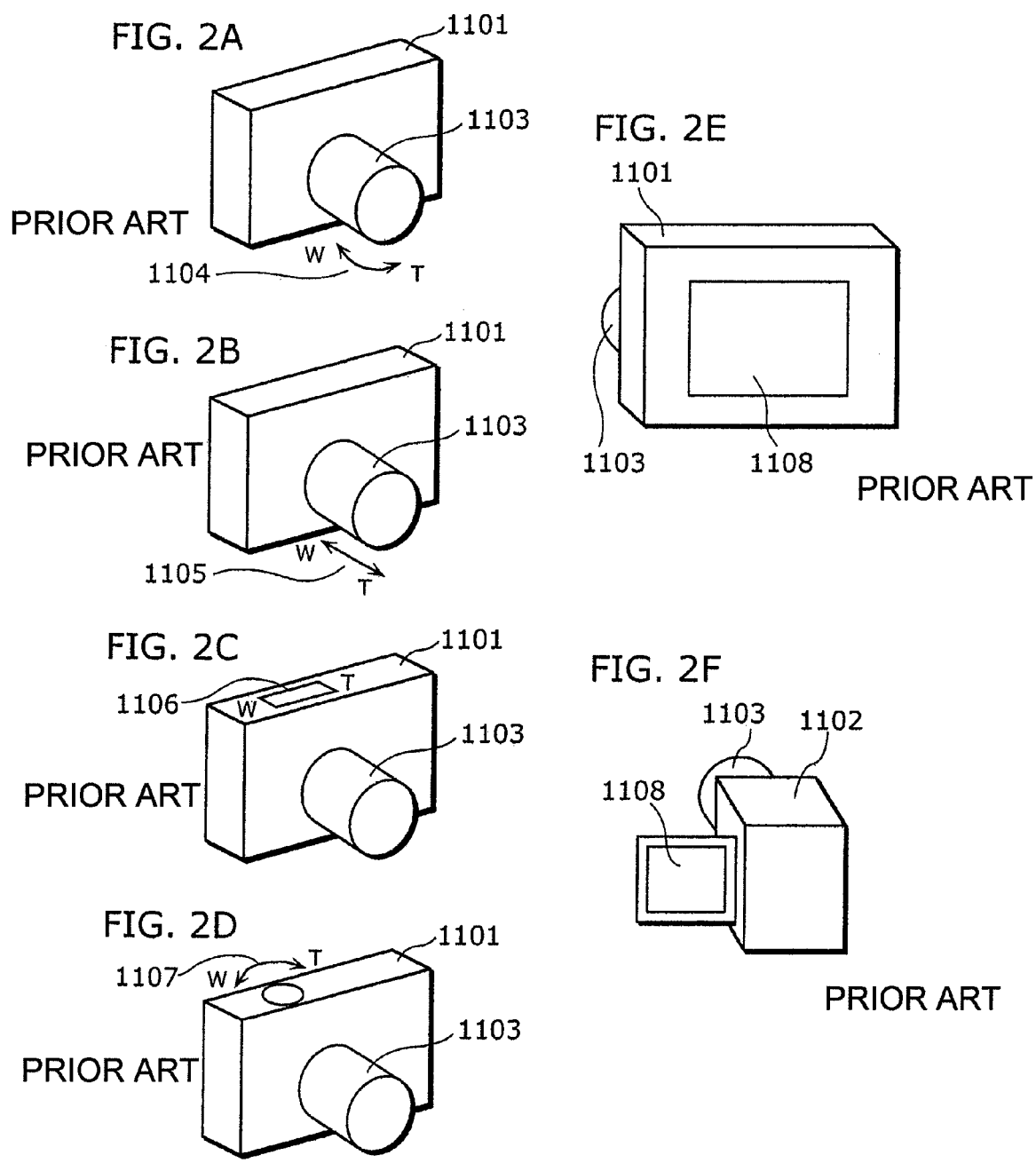

601

602

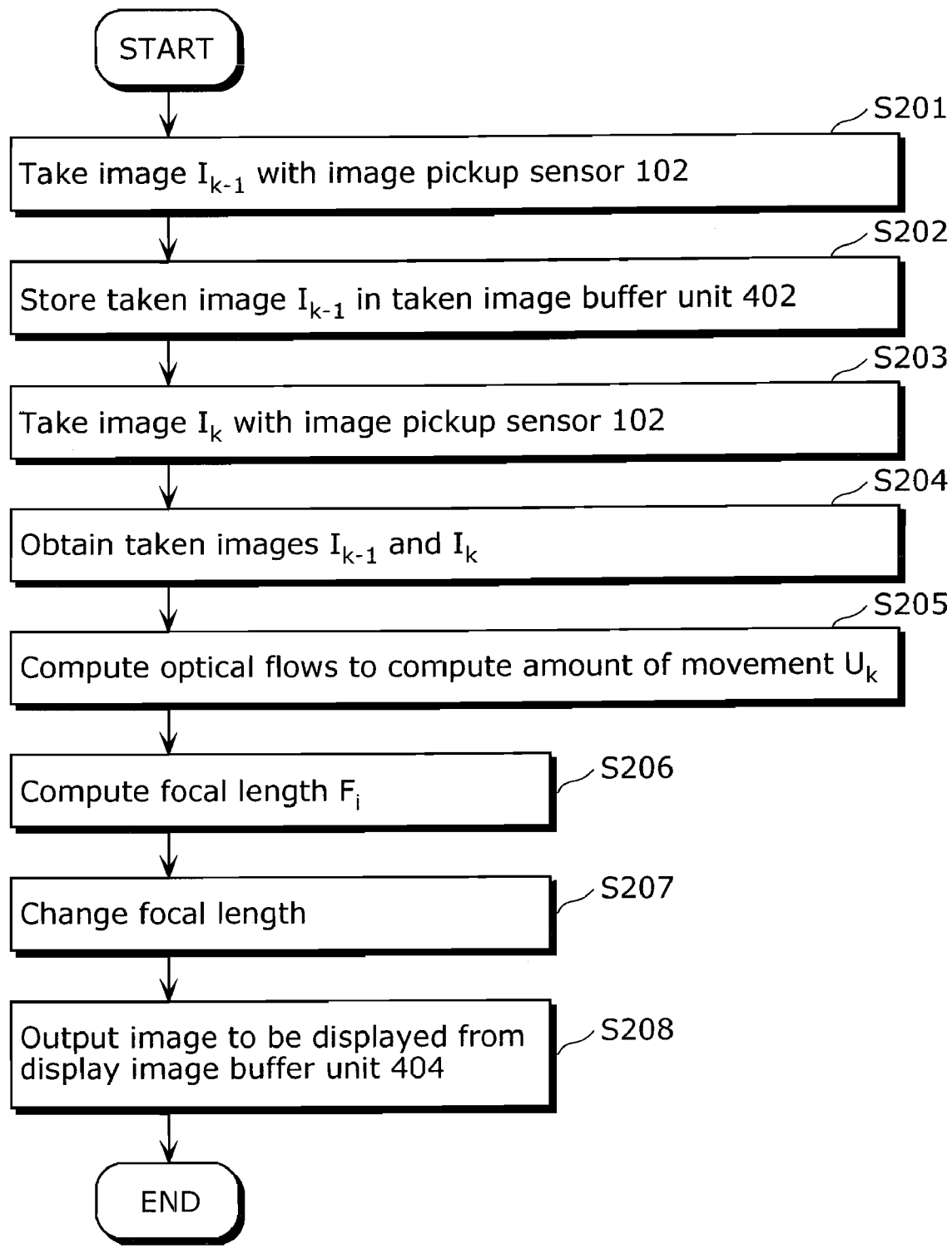

IMAGE TAKING DEVICE, PORTABLE TERMINAL DEVICE, IMAGE TAKING METHOD, AND PROGRAM

TECHNICAL FIELD

The present invention relates to an image taking device for taking an image of a subject by performing zooming, a portable terminal device, an image taking method and a program.

BACKGROUND ART

With the digitization on various devices and the improvements in integration techniques in recent years, cameras capable of digital recording of still and moving images, i.e., digital still cameras and digital video cameras, have become widespread. The affinity of digital recording with other media is high and there are increasing consumer uses of digital recording such as printing with a printer and distribution over a network.

As shown in FIG. 1A, a camera cuts out a portion of a scene 1001 and stores the clipped portion as image data. This is called framing from the meaning of the process in which the cameraperson's operation determines the cut-out position according to his/her image-taking idea and sets a cut-out frame 1002 in the scene. Factors in determination of framing are four: the position 1003 of the camera; the direction 1004 of the camera; the angle 1005 of the camera (held horizontally, held vertically or held obliquely); and the angle of view 1006 from the camera. In these factors, the position of the camera is adjusted by tracking 1008 (leftward/rightward horizontal movement), booming 1009 (vertical movement) and dollying 1010 (frontward/rearward horizontal movement), as shown in the table 1007 of FIG. 1B and in FIG. 1C. The direction of the camera is adjusted by panning 1011 (horizontal turning on a camera center) and tilting 1012 (vertical turning on the camera center), as shown in FIG. 1D. The rotation of the camera is adjusted by rolling 1013 (rotation on the optical axis), as shown in FIG. 1D. The angle of view from the camera is adjusted by dollying 1010 and zooming 1014. For this zooming, optical zoom performed by changing the focal length of the optical system and electronic zoom based on image processing are used. As described above, framing is determined by the cameraperson performing the seven kinds of camera work from tracking 1008 to zooming 1014.

The six kinds of camera work (tracking 1008 to rolling 1013) other than zooming are executed by the cameraperson moving the camera. In zooming 1014 by which the view angle is adjusted, it is necessary for the cameraperson to input commands to the camera as to whether or not the view angle will be increased or reduced and the degree to which the view angle will be changed. A dial operation is ordinarily used to do so (see, for example, Non Patent Reference 1). That is, a still camera 1101 or a movie camera 1102 presently put on the market has a multifocal lens 1103 and is capable of changing the view angle by turning a lens casing 1103 as shown in FIG. 2A, sliding the lens casing 1103 as shown in FIG. 2B, sliding a button 1106 as shown in FIG. 2C or turning a dial 1107 as shown in FIG. 2D. For checking framing, a finder 1108 is used as shown in FIGS. 2E and 2F to enable the cameraperson to check a taken image with his/her eyes.

Non Patent Reference 1: PENTAX Corporation, *istDs user's manual (p. 48), [by search on Nov. 7, 2005], Internet<URL: http://www.pentax.co.jp/japan/support/man-pdf/ist ds.pdf>

DISCLOSURE OF INVENTION

Problems that Invention is to Solve

The conventional zooming, however, entails problems in terms of operability, as described below.

The first problem is that only zooming 1014 in the seven kinds of camera work shown in FIGS. 1A to 1D is alien from the other kinds of camera work and requires certain training for adjustment of framing according to an image-taking idea. FIG. 3 is a diagram showing an example of image taking in which a cameraperson 1201 continuously increases the image-taking magnification of the video camera 1102 while moving around a subject 1202 from a position sideways from the subject 1202 to a position in front of the subject 1202. Images IC1, IC2, and IC3 represent taken images imaged in the finder 1108 of the video camera 1102 and correspond to a 1× image-taking magnification, a 2× image-taking magnification and a 4× image-taking magnification, respectively. In this example of image taking, the cameraperson is required to perform tracking and panning by moving and turning his/her body and to simultaneously perform zooming by operating the dial. Simultaneous execution of bodily control operations, i.e., moving and turning the cameraperson's body, and the operation to input commands to the device, i.e., the dial operation is not easy. This is a considerable problem particularly in consumer uses in which intuitive operability is demanded.

The second problem is that the dial operation itself is not an intuitive operation. That is, the method in which the cameraperson rotates or slides the lens casing is an operating method adapted to the mechanism for the multifocal lens and requiring the cameraperson to understand the operating method according to the mechanism of the camera. In the button or dial operation, there is a need to associate the slide or turning direction with the zoom-in/out direction. This cannot be said to be an operating method directly reflecting an image-taking idea requiring taking the whole scene or details of a particular object.

The present invention has been achieved in consideration of the above-described circumstances, and an object of the present invention is to provide an image taking device, a portable terminal device, an image taking method and a program making it possible to take an image by directly reflecting an image-taking idea while avoiding alienation of zooming from other kinds of camera work.

Means to Solve the Problems

In order to achieve the above object, the image taking device according to the present invention adjusts a taken image according to a positional relationship with a subject, and the image taking device includes: an image taking unit operable to take an image of the subject by using a multifocal lens; a distance computation unit operable to extract a reference figure contained in the image taken by the image taking unit, and compute a distance from the image taking device to the subject on the basis of a difference between the reference figure at a predetermined time and the reference figure at a present time; a focal length computation unit operable to compute a focal length of the multifocal lens on the basis of the distance to the subject; and a focal length control unit operable to control a focal length of the multifocal lens so that the focal length of the multifocal lens is adjusted to the focal length computed by the focal length computation unit.

That is, according to the present invention, zooming is controlled through the movement of the image taking device. The distance from the image taking device to the subject (image taking distance) is measured and the view angle is changed according to a change in the image taking distance. For example, when the image taking device is brought closer to the subject, the view angle is reduced (zoom-in) to take in details of the subject. Conversely, when the image taking device is moved away from the subject, the view angle is increased (zoom-out) to take in the entire scene. The image taking distance is measured with a distance sensor using ultrasonic waves or infrared light for example, or by means of optical flows or the like in the taken image.

EFFECTS OF THE INVENTION

According to the image taking device and the image taking method of the present invention, a camera person controls zooming by moving the image taking device. Therefore the view angle of the image taking device can be determined only through the movement of the image taking device. In this arrangement, zooming alien from six kinds of camera work performing control through the movement of the image taking device (camera) (i.e., tracking, booming, dollying, panning, tilting and rolling) in the conventional art is incorporated in the camera movement, thereby producing consistency in the operating method and improving the operability with respect to framing. Conventionally, the zooming operation, using rotating or sliding of the lens casing, or sliding or turning of a button or a dial, varies among devices, and a cameraperson is required to adapt him/herself to different operating methods among devices. In contrast, in the present invention, the zooming operation is unified on adjustment of the distance between the camera and the subject and is therefore intuitive and easy to understand.

BRIEF DESCRIPTION OF DRAWINGS

FIGS. 1A to 1D are diagrams showing the art related to the present invention.

FIGS. 2A to 2F are diagrams showing the art related to the present invention.

FIG. 16 is a flowchart showing the flow of operation for changing the focal length in the image taking device according to the second embodiment.

Figure 3:
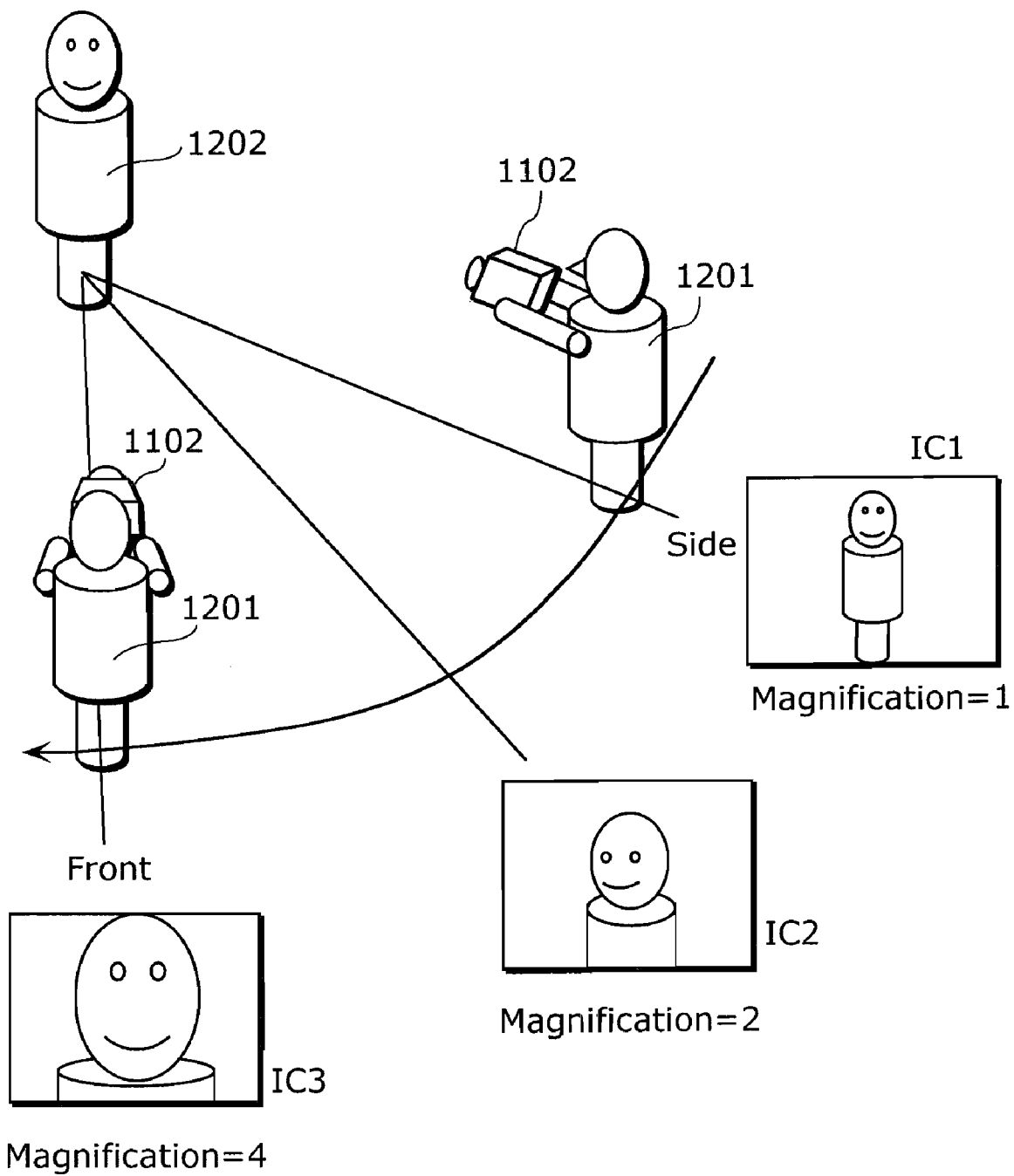
FIG. 3 is a diagram showing the art related to the present invention.

| | Numerical References |
|---|---|
| 100, 400, 800, 900 | image taking device |
| 101 | multifocal lens |
| 102 | image pickup sensor |
| 103 | finder |
| 104 | distance sensor |
| 105 | image taking distance buffer unit |
| 106, 403 | focal length computation unit |
| 107 | focus control unit |
| 108 | memory unit |
| 109 | image recording unit |
| 110 | zoom polarity acceptance unit |
| 111 | zoom polarity selecting unit |
| 200 | camera person |
| 300 | subject |
| 401 | image taking distance change estimation unit |
| 402 | taken image buffer unit |
| 404 | display image buffer unit |
| 801 | cut-out area computation unit |
| 802 | image cut-out unit |
| 901 | view angle sensitivity acceptance unit |
| 902 | view angle sensitivity changing unit |

BEST MODE FOR CARRYING OUT THE INVENTION

The image taking device according to an embodiment of the present invention adjusts a taken image according to a positional relationship with a subject. The image taking device includes: an image taking unit operable to take an image of the subject by using a multifocal lens; a distance computation unit operable to extract a reference figure contained in the image taken by the image taking unit, and compute a distance from the image taking device to the subject on the basis of a difference between the reference figure at a predetermined time and the reference figure at a present time; a focal length computation unit operable to compute a focal length of the multifocal lens on the basis of the distance to the subject; and a focal length control unit operable to control a focal length of the multifocal lens so that the focal length of the multifocal lens is adjusted to the focal length computed by the focal length computation unit.

With this arrangement, the taken image can be zoomed on the basis of the distance to the subject and, therefore, zoom control is incorporated in the framing operation by which the image taking device is moved, so that an operation more intuitive than zoom control based on a button or dial operation for example is made possible.

Moreover, the image taking device according to another embodiment of the present invention adjusts a taken image according to a positional relationship with a subject. The image taking device includes: an image taking unit operable to take an image of the subject by using a multifocal lens; a distance computation unit operable to extract a reference figure contained in the image taken by the image taking unit, and compute a distance from the image taking device to the subject on the basis of a difference between the reference figure at a predetermined time and the reference figure at a present time; a cut-out area computation unit operable to compute an image area to be cut out of the taken image on the basis of the distance to the subject; and an image cut-out unit operable to cut out a portion of the taken image according to a result of the computation by the cut-out area computation unit.

With this arrangement, the image area to be cut out of the taken image can be controlled on the basis of the distance to the subject and, therefore, cut-out image area control is incorporated in the framing operation by which the image taking device is moved, so that an operation more intuitive than cut-out image area control based on a button or dial operation for example is made possible.

Also, the focal length computation unit may compute the focal length of the multifocal lens on the basis of the difference between the distance to the subject at the predetermined time and the distance to the subject at the present time.

Further, the focal length computation unit may be operable to compute the focal length of the multifocal lens so that the focal length is increased, when the distance to the subject at the present time is shorter than the distance to the subject at the predetermined time, and to compute the focal length of the multifocal lens so that the focal length is reduced, when the distance to the subject at the present time is longer than the distance to the subject at the predetermined time.

Also, the cut-out area computation unit may compute the image area to be cut out of the taken image on the basis of the difference between the distance to the subject at the predetermined time and the distance to the subject at the present time.

Furthermore, the cut-out area computation unit may be operable to compute the cut-out image area on the taken image so that the image area is reduced, when the distance to the subject at the present time is shorter than the distance to the subject at the predetermined time, and to compute the cut-out image area on the taken image so that the image area is increased, when the distance to the subject at the present time is longer than the distance to the subject at the predetermined time.

With this arrangement, when the distance to the subject can be reduced (when the image taking device is brought closer to the subject), the focal length or the cut-out image area is controlled to reduce the image taking view angle and take in derails of the subject. Conversely, when the distance to the subject can be increased (when the image taking device is moved away from the subject), the focal length or the cut-out image area is controlled to increase the image taking view angle and take in the entire scene.

Still further, the focal length computation unit may be operable to compute the focal length of the multifocal lens so that the focal length is reduced, when the distance to the subject at the present time is shorter than the distance to the subject at the predetermined time, and to compute the focal length of the multifocal lens so that the focal length is increased, when the distance to the subject at the present time is longer than the distance to the subject at the predetermined time.

Still further, the cut-out area computation unit may be operable to compute the cut-out image area on the taken image so that the image area is increased, when the distance to the subject at the present time is shorter than the distance to the subject at the predetermined time, and to compute the cut-out image area on the taken image so that the image area is reduced, when the distance to the subject at the present time is longer than the distance to the subject at the predetermined time.

With this arrangement, when the distance to the subject can be increased (when the image taking device is moved away from to the subject), the focal length or the cut-out image area is controlled to reduce the image taking view angle and take in derails of the subject. Conversely, when the distance to the subject can be reduced (when the image taking device is brought closer to the subject), the focal length or the cut-out image area is controlled to increase the image taking view angle and take in the entire scene.

Still further, the focal length computation unit may be operable to weight a difference between the distance to the subject at the predetermined time and the distance to the subject at the present time to make variable a rate of contribution of (i) the difference between the distances to the subject to (ii) an amount of change in the focal length of the multifocal lens.

Still further, the cut-out area computation unit may be operable to weight a difference between the distance to the subject at the predetermined time and the distance to the subject at the present time to make variable a rate of contribution of (i) the difference between the distances to the subject to (ii) an amount of change in the image area to be cut out of the taken image.

With this arrangement, the relationship between the amount of change in the distance to the subject and the amount of change in the focal length or the cut-out image area can be changed according to use circumstances to enable image taking according to the use circumstances.

Still further, the distance computation unit may extract a reference figure contained in the image taken by the image taking unit and compute the distance to the subject on the basis of the difference between the reference figure at the predetermined time and the reference figure at the present time.

Still further, the distance computation unit may be operable to measure the difference in the reference figures on the basis of at least one of a position, size, shape, lightness, and color of the reference figure.

Note that the present invention can be implemented not only as the above-described image taking device but also as an image taking method having steps corresponding to the characteristic constituents of the image taking device and as a program for making a computer execute the steps of the method. Needless to say, such a program can be distributed by means of a recording medium such as a CD-ROM or a transmission medium such as the Internet.

Embodiments of the present invention will be described in detail with reference to the accompanying drawings.

First Embodiment

A first embodiment of the present invention will be described with respect to an image taking device which measures the distance to a subject by means of a distance sensor and controls the image-taking view angle according to the distance.

Figure 4:
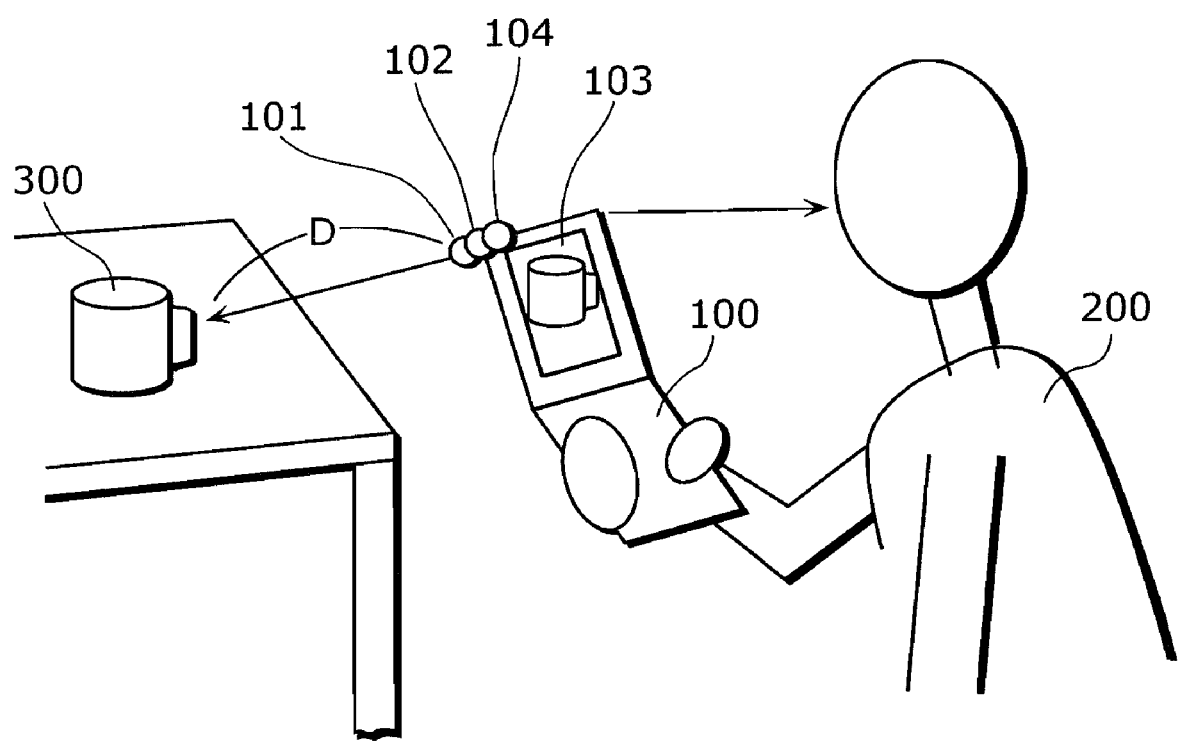
FIG. 4 is a schematic diagram showing taking of an image of a subject performed by using an image taking device according to a first embodiment of the present invention.
Figure 5:
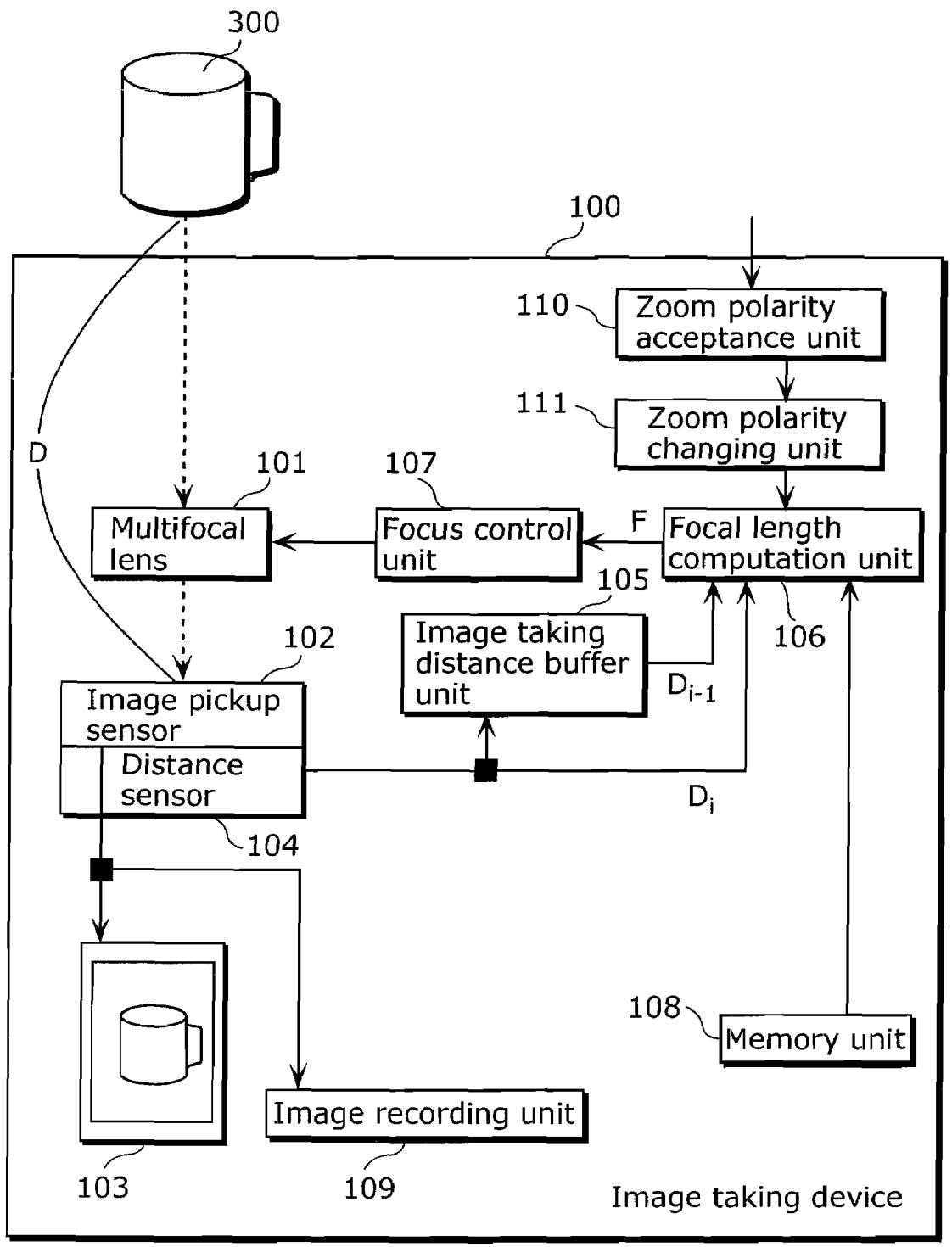
FIG. 5 is a block diagram showing the configuration of the image taking device according to the first embodiment.

FIG. 4 is a schematic diagram showing taking of an image of a subject performed by a cameraperson using an image taking device according to the first embodiment of the present invention. FIG. 5 is a block diagram showing the configuration of the image taking device according to the first embodiment of the present invention.

The image taking device 100 is a device for taking an image of a subject 300 characterized by adjusting (zooming) a taken image according to the positional relationship with the subject (the distance to the subject). As shown in FIG. 5, the image taking device 100 has a multifocal lens 101, an image pickup sensor 102, a finder 103, a distance sensor 104, an image taking distance buffer unit 105, a focal length computation unit 106, a focus control unit 107, a memory unit 108, an image recording unit 109, a zoom polarity acceptance unit 110, and a zoom polarity selecting unit 111.

The multifocal lens 101 changes the focal length to change the image taking area (i.e., the view angle) on a subject 300 from which an image is taken with the image pickup sensor 102. The image pickup sensor 102 is, for example, a CCD sensor, a CMOS sensor or the like for taking an image of the subject. The finder 103 displays an image of the subject 300 taken with the image pickup sensor 102 through the multifocal lens 101. The distance sensor 104 measures the distance to the subject 300 (image taking distance D) by using, for example, an ultrasonic sensor or an infrared sensor. The image taking distance buffer unit 105 temporarily stores the image taking distance $D_{i-1}$ measured at a past time $T_{i-1}$. The focal length computation unit 106 computes the focal length F of the multifocal lens 101 on the basis of the image taking distance $D_i$ at the present time $T_i$ measured by the distance sensor 104 and the image taking distance $D_{i-1}$ supplied from the image taking distance buffer unit 105. The focus control unit 107 controls the focal length of the multifocal lens 101 so that the focal length of the multifocal lens 101 becomes equal to the focal length F computed by the focal length computation unit 106. The memory unit 108 supplies the focal length computation unit 106 with an initial set value read at the time of startup of the image taking device. The image recording unit 109 records a taken image of the subject 300 taken by the image pickup sensor 102 at the time of recording. The zoom polarity acceptance unit 110 accepts a selection between zoom-in (enlarging the image by reducing the view angle) and zoom-out (reducing the image by increasing the view angle) from the cameraperson. The zoom polarity selecting unit 111 changes the zoom polarity according to the polarity (zoom-in or zoom-out) accepted by the zoom polarity acceptance unit 110 and gives the zoom polarity to the focal length computation unit 106.

The operation in a case where a cameraperson 200 takes an image of the subject 300 by using the image taking device 100 constructed as described above will now be described.

Figure 6:
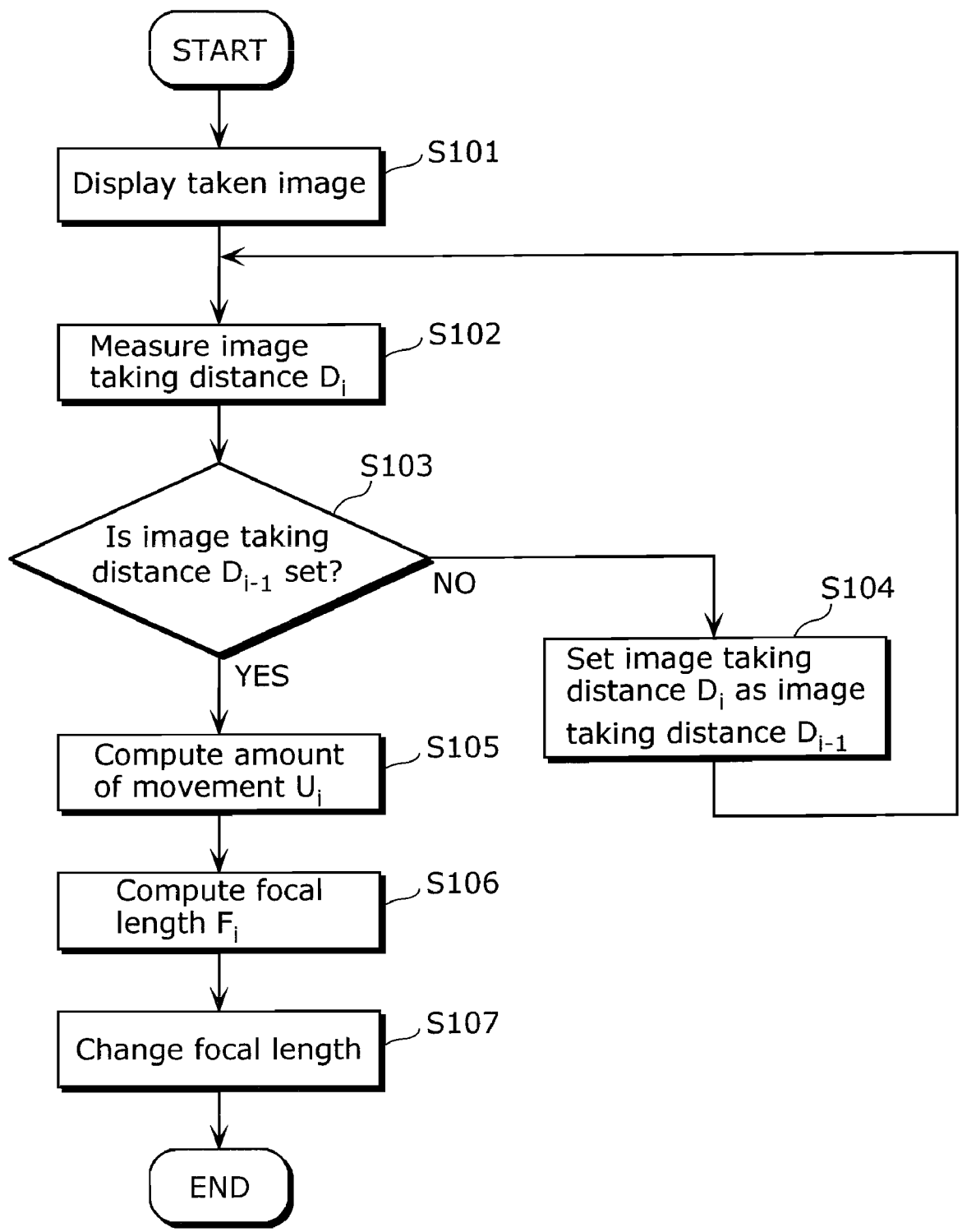
FIG. 6 is a flowchart showing the flow of operation for changing the focal length in the image taking device according to the first embodiment.

FIG. 6 is a flowchart showing the flow of operation for changing the focal length in the image taking device 100.

The image taking device 100 displays, on the finder 103, at time $T_i$, an image of the subject 300 taken by the image pickup sensor 102 through the multifocal lens 101 (step S101). Simultaneously, the distance sensor 104 measures the distance to the subject 300 (image taking distance D) and outputs the measured image taking distance $D_i$ to the image taking distance buffer unit 105 and to the focal length computation unit 106 (step S102). The image taking distance buffer unit 105 makes a judgment as to whether or not the image taking distance $D_{i-1}$ recorded at the past time $T_{i-1}$ before the time $T_i$ is set (step S103). If the result of this judgment is that the image taking distance $D_{i-1}$ is not set, the image taking distance buffer unit 105 records as the image taking distance $D_{i-1}$ the image taking distance $D_i$ inputted from the distance sensor 104 (step S104).

If the image taking distance $D_{i-1}$ is set, the focal length computation unit 106 computes an amount of movement $U_i$, which is the difference between the image taking distance $D_{i-1}$ and the image taking distance $D_i$, by the following equation (1) (step S105).

[Formula 1]

$$U_i = D_i - D_{i-1} \quad \text{(Equation 1)}$$

If the amount of movement $U_i$ is negative, it can be understood that the image taking device 100 and the subject 300 have moved closer to each other. If the amount of movement $U_i$ is positive, it can be understood that the image taking device 100 and the subject 300 have moved away from each other.

Figure 7:
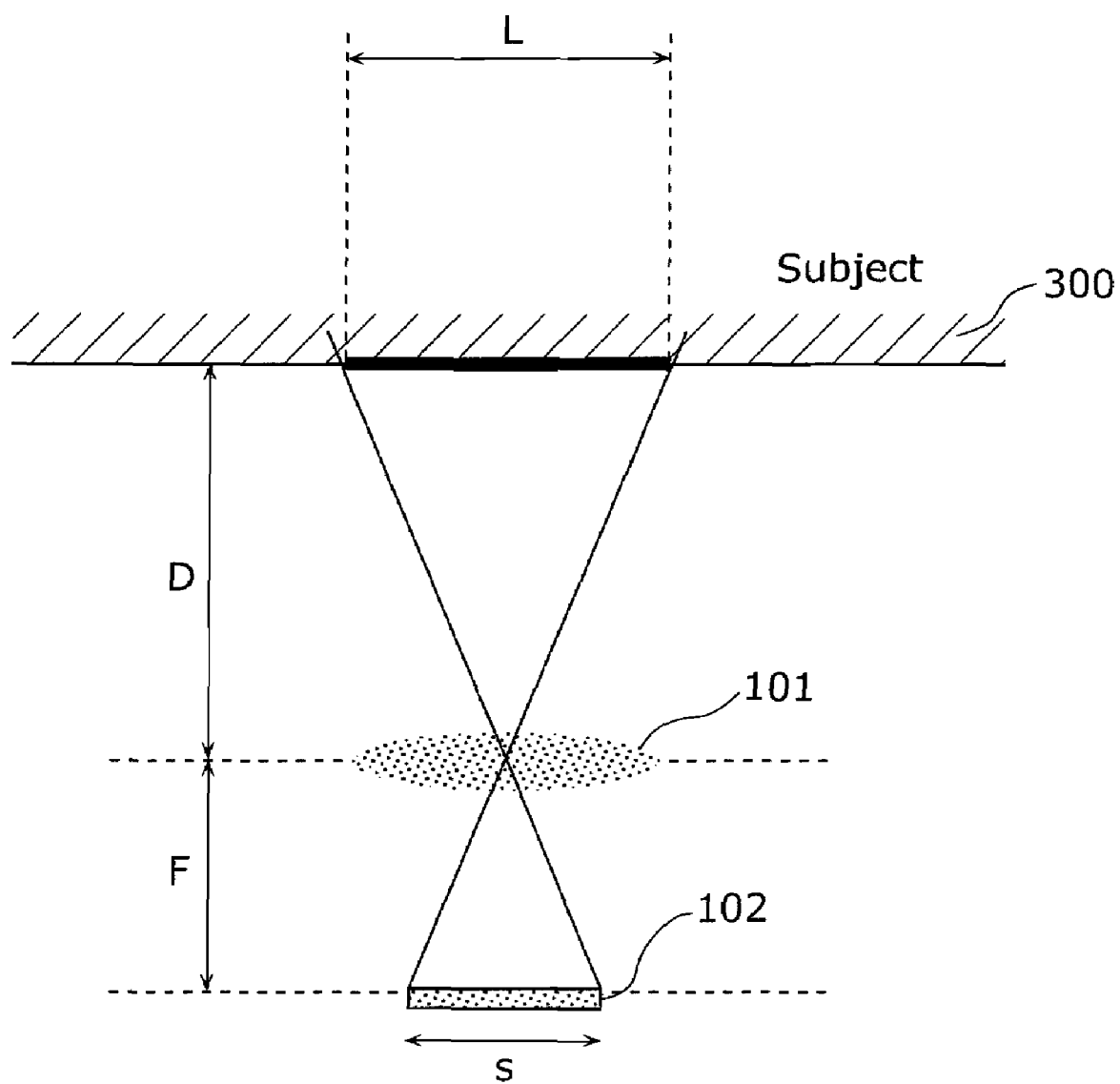
FIG. 7 is a diagram showing the relationship between the focal length, the view angle, the image taking distance and the size of an image pickup sensor.

Subsequently, the focal length computation unit 106 computes the focal length F on the basis of the amount of movement $U_i$ (step S106). If, as shown in FIG. 7, the focal length is F; the length of the subject 300 taken as an image (corresponding to the view angle) is L; the distance between the subject 300 and the multifocal lens 101 is D; and the size of the image pickup sensor 102 is S, these are in the following relationship:

[Formula 2]

$$F = \frac{S}{L} D \quad \text{(Equation 2)}$$

The focal length F and the view angle L are inversely proportional to each other. For example, when the focal length F is made eight times larger from 24 to 192 mm, the view angle L is reduced to ⅛ and an image enlarged at an 8× magnification can be taken.

Figure 8:
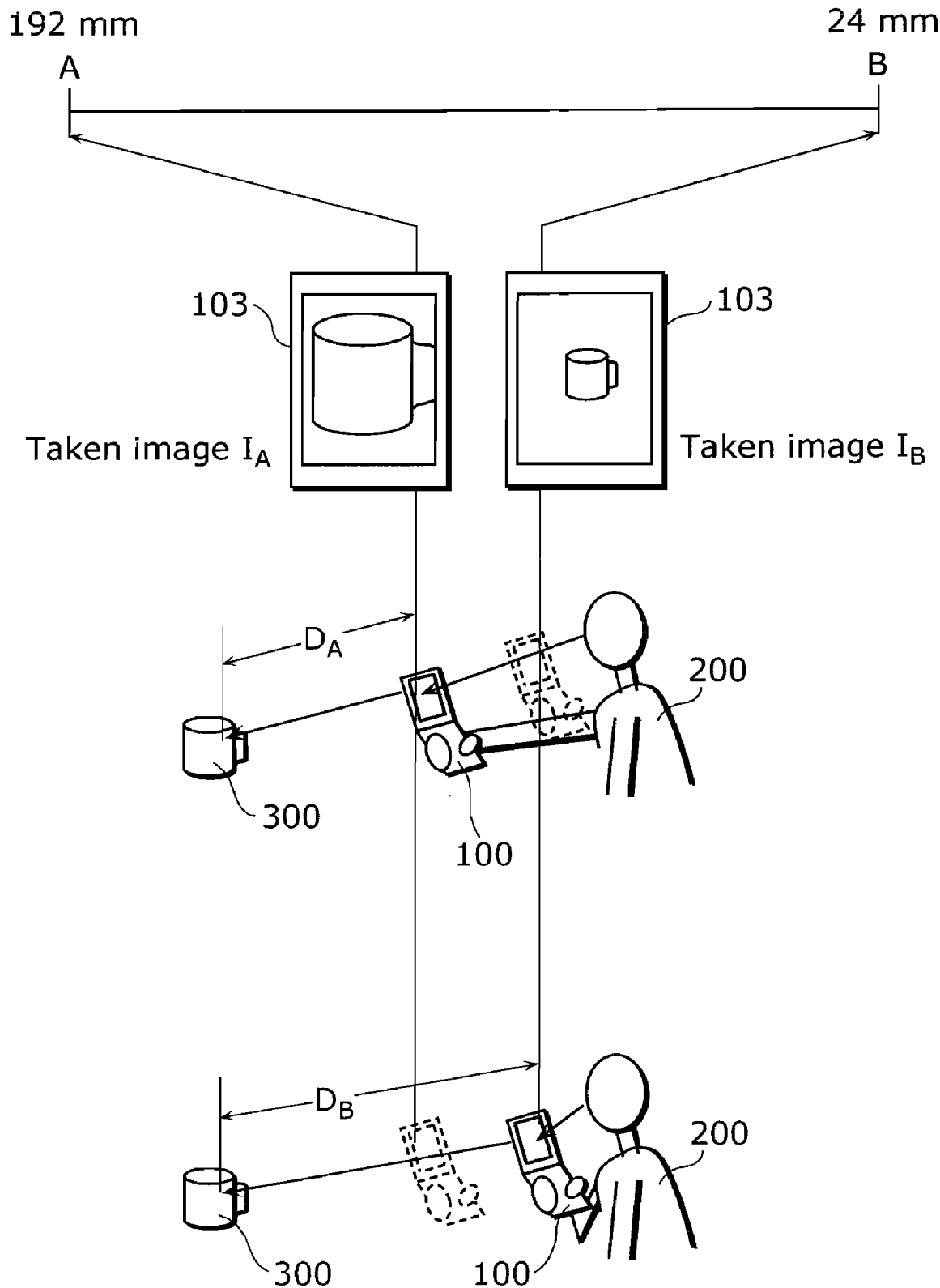
FIG. 8 is a diagram showing an example of the relationship between the position of the image taking device and the focal length.

FIG. 8 is a diagram showing an example of the relationship between the position of the image taking device 100 and the focal length F. In this example, the focal length is 192 mm at a position A (image taking distance $D_A$) at which the cameraperson 200 can recognize an image on the finder 103, and which is reached when the image taking device 100 is brought closest to the subject 300 in the range of movement in which the image taking device 100 is moved by folding and stretching the cameraperson's arm. At this position, an image enlarged at the maximum magnification, as represented by a taken image IA, is taken. The focal length is 24 mm at a position B (image taking distance $D_B$) which is reached when the image taking device 100 is remotest from the subject 300. At this position, an image reduced at the minimum magnification, as represented by a taken image $I_B$, is taken. Thus, the focal length is changed from 24 to 192 mm in the range of amount of movement $D_B - D_A$. Since the range of the value taken by the image taking distance D varies, the amount of movement $U_i$ is divided by the amount of movement $D_B$–$D_A$ to be normalized to 0 to 1 as shown in the following equation (3).

[Formula 3]

$$V_i = \frac{U_i}{D_A - D_B} \qquad \text{(Equation 3)}$$

Figure 9:
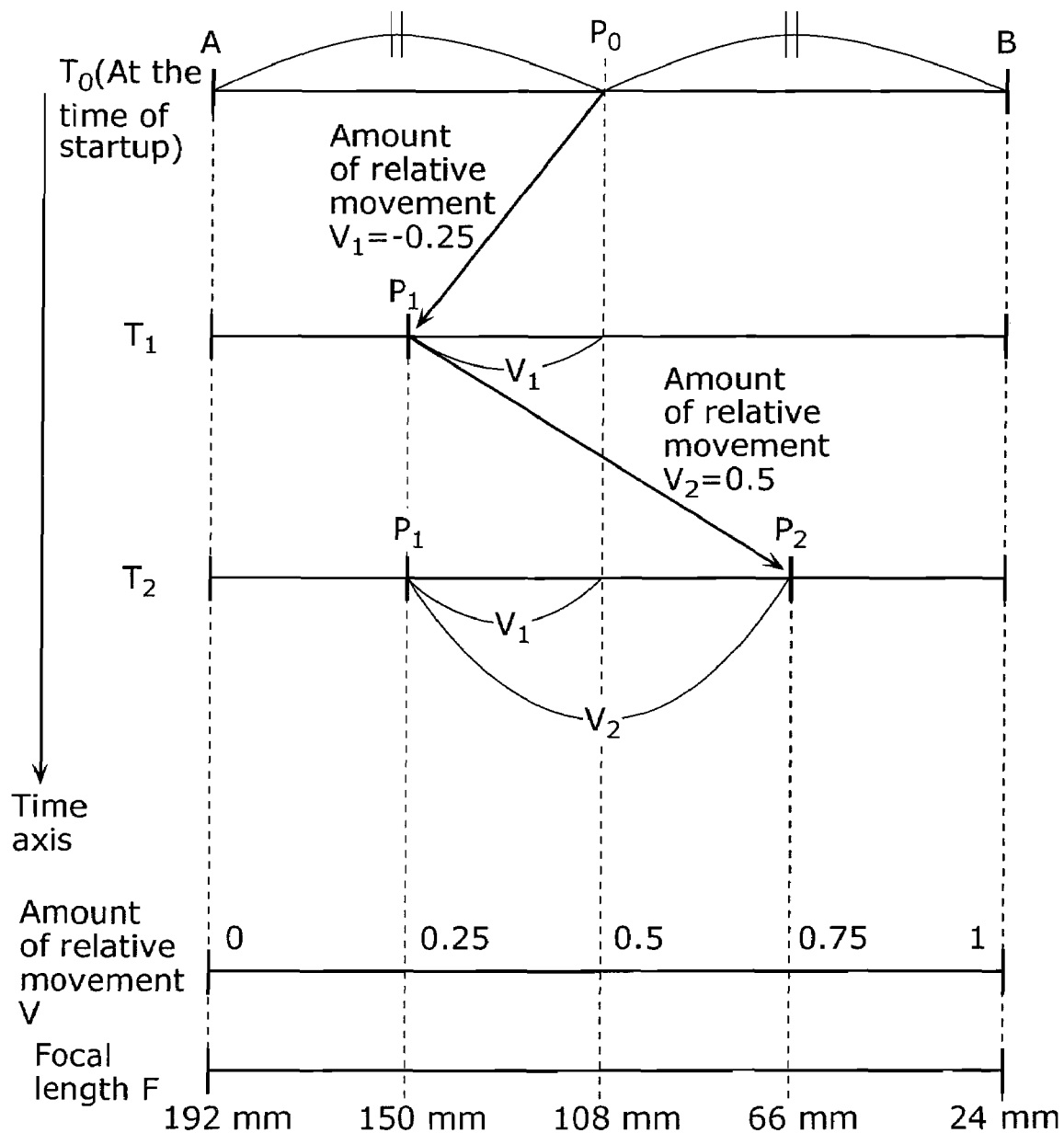
FIG. 9 is a diagram showing an example of changes in the position of the image taking device and the focal length.

FIG. 9 is a diagram showing an example of changes over time in the position of the image taking device 100 and the focal length F, using the one-dimensional coordinate system described with respect to FIG. 8. Position $P_0$ represents the position at time $T_0$ at which the image taking device 100 is started. In this example, the position $P_0$ is the midpoint between the point A (the position closest to the subject 300) and the point B (the position remotest from the subject 300). Since the position of the image taking device and the focal length are linearly associated with each other, the focal length is set to a middle value of 108 mm (=(24+192)/2)) at the position $P_0$. For example, if an amount of relative movement $V_1$=–0.25 is detected at time $T_1$, and if the movement of the image taking device to a position $P_1$ is completed, the focal length is changed to 150 mm (=108–(192–24)×(–0.25)). Also, if an amount of relative movement $V_2$=–0.5 is detected at time $T_2$, and if the movement of the image taking device to a position $P_2$ is completed, the focal length is changed to 66 mm (=150–(192–24)×–0.5).

According to the above example, the focal length $F_i$ at time $T_i$ can be expressed by the following equation:

[Formula 4]

$$F_i = F_{i-1} - V_i(F_{max} - F_{min}) \qquad \text{(Equation 4)}$$

Figure 10A:
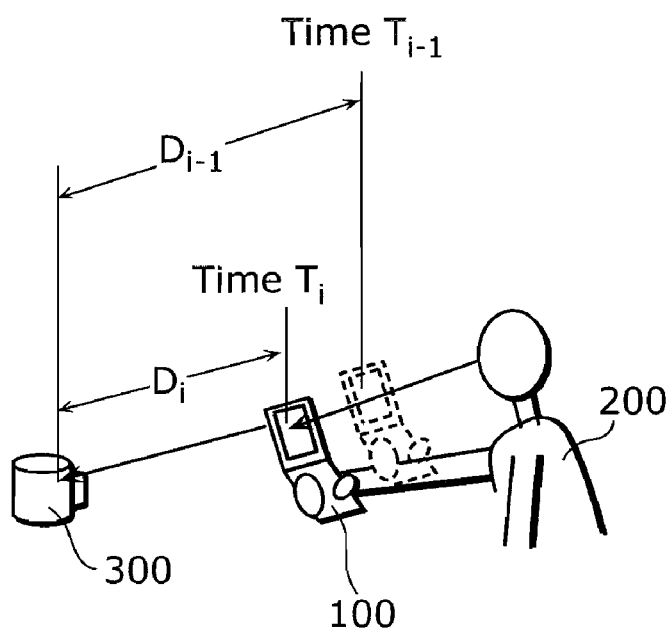
FIGS. 10A to 10D are diagrams for explaining the relationship between changes in the image taking distance and changes in the view angle on the basis of equation (4).
Figure 10B:
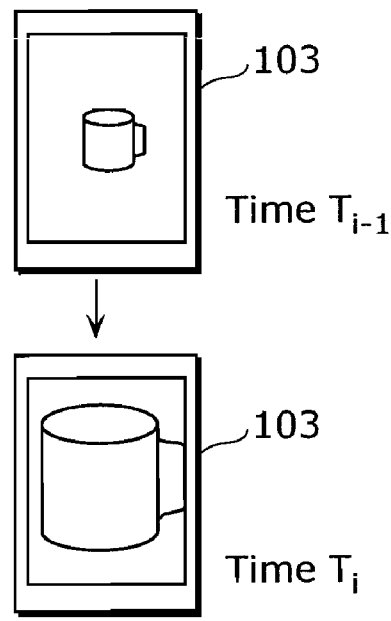
Figure 10C:
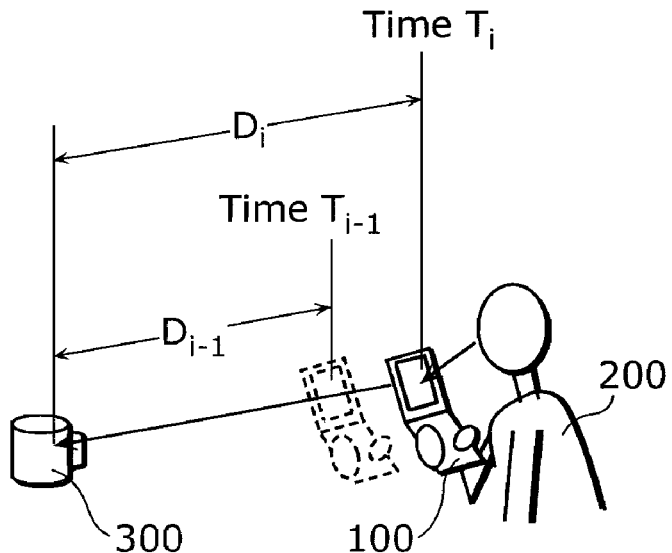
Figure 10D:
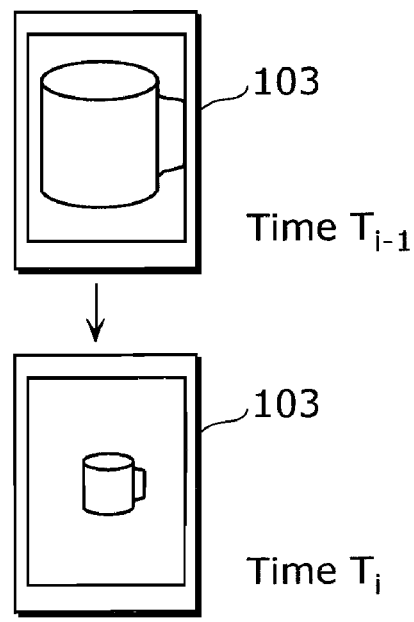

In this equation, $F_{i-1}$ is the focal length at time $T_{i-1}$, $F_{max}$ is the maximum of the focal length, and $F_{min}$ is the minimum of the focal length. According to equation (4), the image taking device 100 functions so as to enlarge the image as shown in FIG. 10B when brought closer to the subject 300 as shown in FIG. 10A. That is, with the progress of time from time $T_{i-1}$ to time $T_i$, the image taking distance D becomes shorter (image taking distance $D_{i-1}$>image taking distance $D_i$) and the amount of relative movement $V_i$ becomes negative according to equation (3). When the amount of relative movement $V_i$ in equation (4) is negative, the focal length F becomes longer and the taken image is enlarged. Also, according to equation (4), the image taking device 100 functions so as to reduce the image as shown in FIG. 10D when moved away from the subject 300 as shown in FIG. 10C. With the progress of time from time $T_{i-1}$ to time $T_i$, the image taking distance D becomes longer (image taking distance $D_{i-1}$<image taking distance $D_i$) and the amount of relative movement $V_i$ becomes positive according to equation (3). When the amount of relative movement $V_i$ in equation (4) is positive, the focal length F becomes shorter and the taken image is reduced.

If the relationship between the positivity/negativity of the amount of movement Vi and the image enlargement/reduction is reversely set, equation (5) is obtained.

[Formula 5]

$$F_i = F_{i-1} + V_i(F_{max} - F_{min}) \qquad \text{(Equation 5)}$$

Figure 11A:
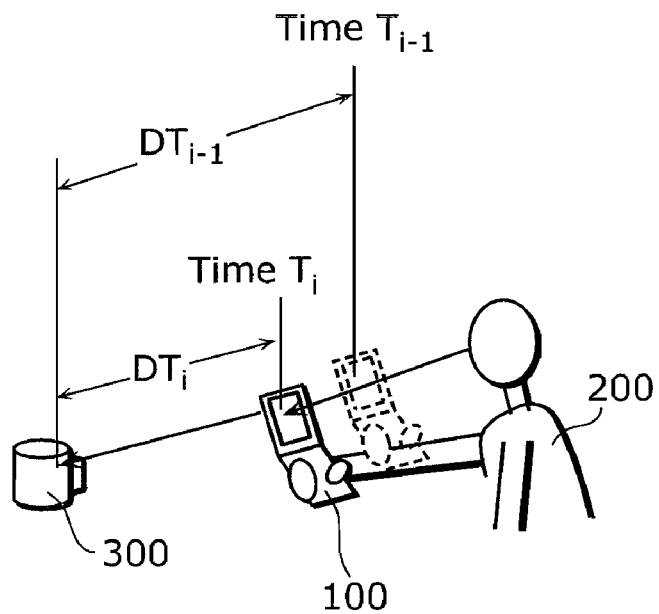
FIGS. 11A to 11D are diagrams for explaining the relationship between changes in the image taking distance and changes in the view angle on the basis of equation (5).
Figure 11B:
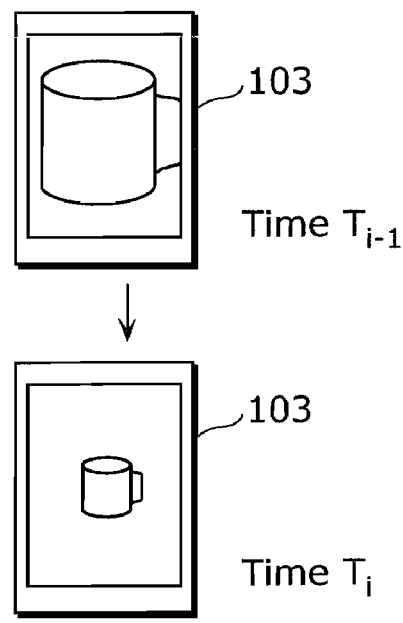
Figure 11C:
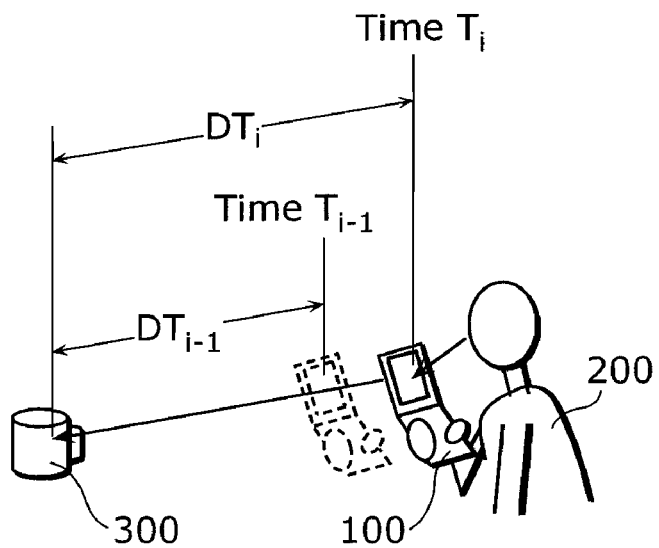
Figure 11D:
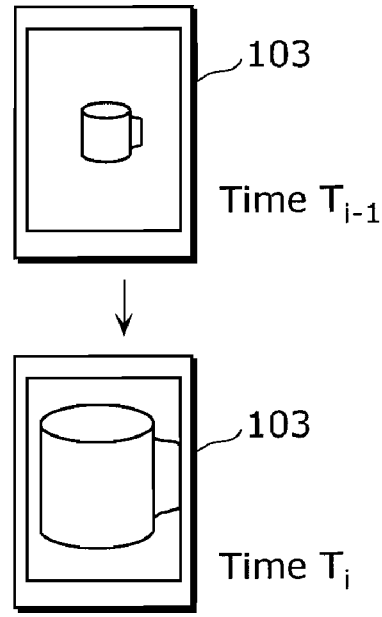

According to equation (5), the image taking device 100 functions so as to reduce the image as shown in FIG. 11B when brought closer to the subject 300 as shown in FIG. 11A. That is, with the progress of time from time $T_{i-1}$ to time $T_i$, the image taking distance D becomes shorter (image taking distance $D_{i-1}$>image taking distance $D_i$) and the amount of rela-tive movement $V_i$ becomes negative according to equation (3). When the amount of relative movement $V_i$ in equation (5) is negative, the focal length F becomes shorter and the taken image is reduced. Also, according to equation (5), the image taking device 100 functions so as to enlarge the image as shown in FIG. 11D when moved away from the subject 300 as shown in FIG. 11C. With the progress of time from time $T_{i-1}$ to time $T_i$, the image taking distance D becomes longer (image taking distance $D_{i-1}$<image taking distance $D_i$) and the amount of relative movement $V_i$ becomes positive according to equation (3). When the amount of relative movement $V_i$ in equation (5) is positive, the focal length F becomes longer and the taken image is enlarged.

Thus, the focal length $F_i$ given by equation (4) or (5) is outputted as the focal length F to the focus control unit 107. However, when the focal length $F_i$ in equation (4) or (5) exceeds the range of the focal length of the multifocal lens 101, it is clipped to be limited within the range.

Figure 12:
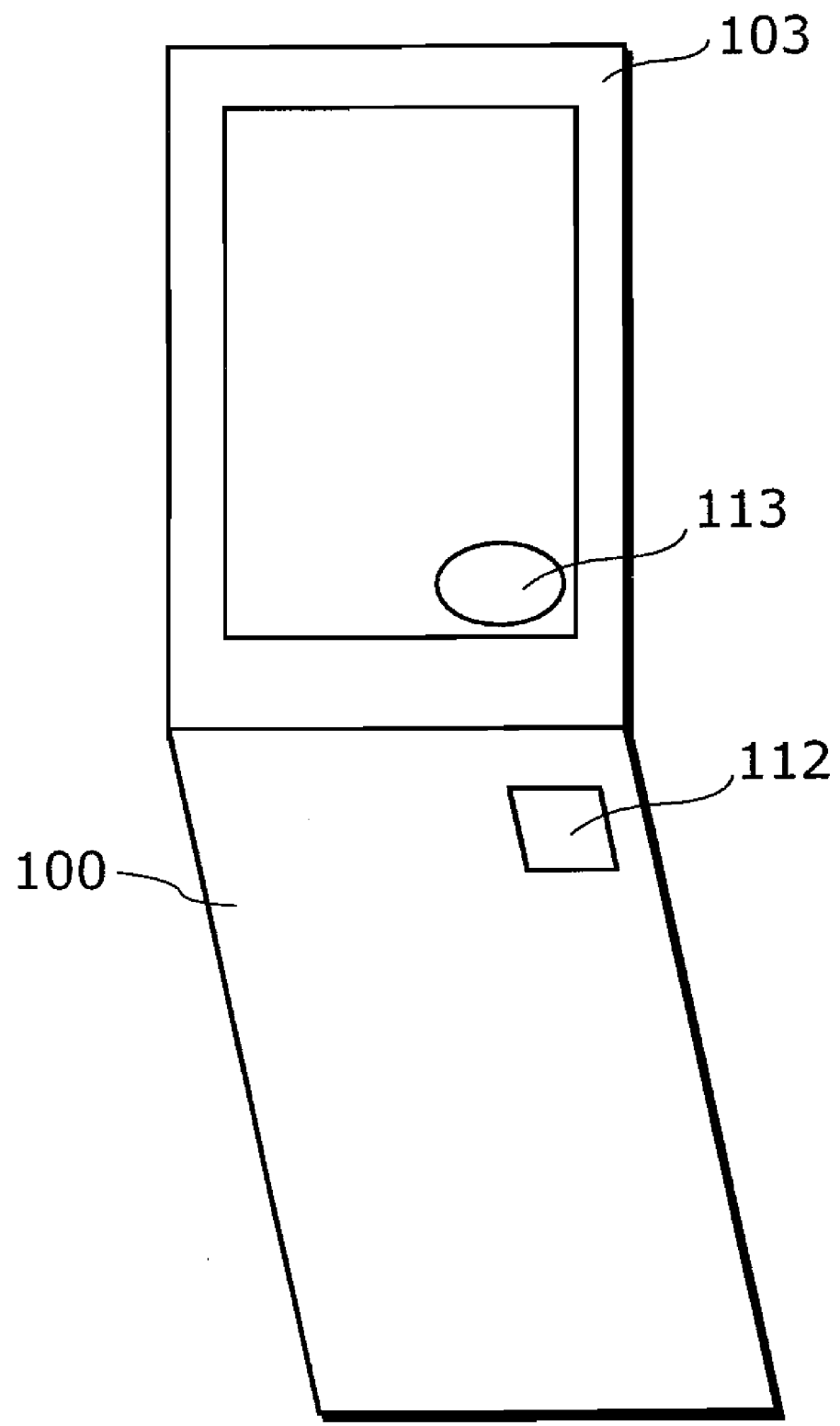
FIG. 12 is a diagram for explaining a zoom polarity selection button.

The focal length computation unit 106 reads selection between equations (4) and (5) from the memory unit 108 storing an initial setting at the time of startup of the image taking device 100. For example, equation (4) is stored in the memory unit 108 at the time of factory shipping and is set when the image taking device is first started. If the cameraperson wants to select equation (5) for the opposite polarity, he/she presses a zoom polarity selection button 112 shown in FIG. 12 to make the zoom polarity acceptance unit 110 accepts equation (5) for the opposite polarity. The zoom polarity selecting unit 111 gives to the focal length computation unit 106 equation (5) for the opposite polarity accepted by the zoom polarity acceptance unit 110. Also, the zoom polarity acceptance unit 110 displays on the finder 103 an icon 113 indicating the accepted zoom polarity. Each time the zoom polarity selection button 112 is pressed through one stroke, equations (4) and (5) are changed and the cameraperson can check the zoom polarity by seeing the icon 113 displayed on the finder 103. Needless to say, the cameraperson can know the zoom polarity by actually operating the image taking device 100 and visually checking changes in the image displayed on the finder 103. When the image taking device 100 is powered off and when shutdown processing is started, the focal length computation unit 106 records the zoom polarity (equation (4) or (5)) in the memory unit 108. Use of the image taking device can be started from the same setting by reading the zoom polarity from the memory unit 108 when the image taking device is started next time.

Computation of equation (3) requires the amount of movement $D_A$–$D_B$. Therefore the amount of movement $D_A$–$D_B$ is inputted from the memory unit 108 to the focal length computation unit 106 at the time of startup of the image taking device 100. As shown in FIG. 8, the amount of movement $D_A$–$D_B$ corresponds to the distance between the position A at which the arm is stretched and the position B at which the arm is folded. As an example of a method of determining the actual value, an empirical method, a user input method, an estimation method or the like is conceivable. In an empirical method, a method of using the image taking device and a use scene are assumed and a suitable value is determined by comparison with past empirical data. Alternatively, a plurality of monitors may be collected to measure the amount of movement $D_A$–$D_B$ and the average of measured values may be used. In a user input method, the cameraperson 200 moves the image taking device 100 to the positions A and B shown in FIG. 8 to initialize the image taking distances $D_A$ and $D_B$ with respect to a certain object. In an estimation method, the amount of movement $D_A$–$D_B$ is temporarily set by an empirical method, the change of the focal length F is monitored for a certain time period, and a suitable amount of movement $D_A-D_B$ is estimated by the focal length computation unit 106. That is, in the case of application to the example shown in FIG. 9, if the focal length F is changed only within the range from 80 to 130 mm while the variable range of the focal length between the positions A and B is 24 to 192 mm, it is estimated that the amount of movement $D_A-D_B$ is excessively large. Then the amount of movement $D_A-D_B$ is set to 50 mm (=130 mm−80 mm).

If the focal length F is set according to the position of the image taking device 100 at the time of startup of the image taking device 100, full use between a state where the arm is stretched and a state in which the arm is folded, as shown in FIG. 8, can be made. That is, if, when the position of the image taking device 100 is at the middle point between the positions A and B as shown in FIG. 9, the focal length F is also set to the middle length (i.e., 108 mm), the focal length can be fully controlled from the maximum length (i.e., 192 mm) to the minimum length (i.e., 24 mm) through the entire arm stretch/fold range. Alternatively, when the image taking device 100 is started at the position A, the focal length is set to the maximum length (i.e., 192 mm). To attain these settings, there is a need to provide an explicit instruction to the cameraperson. For example, with respect to powering on the image taking device, the position at the time of powering-on is specified in correspondence with the middle point between the positions A and B or as the position A or B. Alternatively, a guidance in the form of a text, an illustration, an image or the like is displayed on the finder 103 to instruct the cameraperson 200 to stretch his/her arm and to thereby move the image taking device 100 to the position A and set the focal length to the maximum within a prescribed time period (e.g., three seconds). After the passage of the prescribed time period, the cameraperson 200 is informed through the guidance on the finder 103 of cancellation of the instruction to stretch the arm. The same also applies with respect to the position B or the middle point between the positions A and B. In a case where the focal length is set without providing any instruction to the cameraperson, an initial set value is provided in the memory unit 108 to be automatically set in the focal length computation unit 106 at the time of startup of the image taking device. As the initial set value, a position at which the cameraperson naturally holds the image taking device at the time of powering on the image taking device is assumed. The focal length corresponding to this position is provided in the memory unit 108.

The focus control unit 107 then changes the focal length F of the multifocal lens 101 so that it equals the focal length F inputted from the focal length computation unit 106 (step S107).

The image taking device operates as described above. The focal length F of the multifocal lens 101 can be changed with the change in the image taking distance D when the cameraperson 200 moves the image taking device by holding the device in his/her hand. Thus, the zooming operation is incorporated in a plurality of kinds of camera work such as those described with reference to FIG. 3 (tracking and panning in the described example) to improve the operability with respect to framing. While the subject 1202 in FIG. 3 is stationary, the difficulty in framing is further increased when the subject 1202 moves. In particular, when the distance between the subject 1202 and the image taking device 1102 is changed, the possibility of change of the polarity of the zoom magnification (zoom-in or zoom-out) is increased. According to the present invention, however, the polarity of the zoom magnification can be changed by means of the zoom polarity selection button 112.

The multifocal lens is used as a device for changing the focal length F according to the above description. However, the present invention is not limited to this. Digital zoom based on image processing or a combination of optical zoom and digital zoom may alternatively be used.

As described above, zooming is incorporated in the frame operation by which the image taking device is moved, thereby making possible an operation more direct than view angle adjustment by a button or dial operation. Consequently, an image taking device can be provided which has improved operability in the field of the field of video entertainment where a scene before the eyes of a person, e.g., a sport scene, a scene in sightseeing or a scene to be taken as a souvenir picture is recorded as an image.

Second Embodiment

A second embodiment of the present invention will be described with respect to an image taking device which estimates an amount of change in the distance to a subject (an amount of change in image taking distance) by means of a single image pickup sensor provided in place of the distance sensor of the first embodiment and controls the view angle according to the amount of change in the image taking distance.

Figure 13:
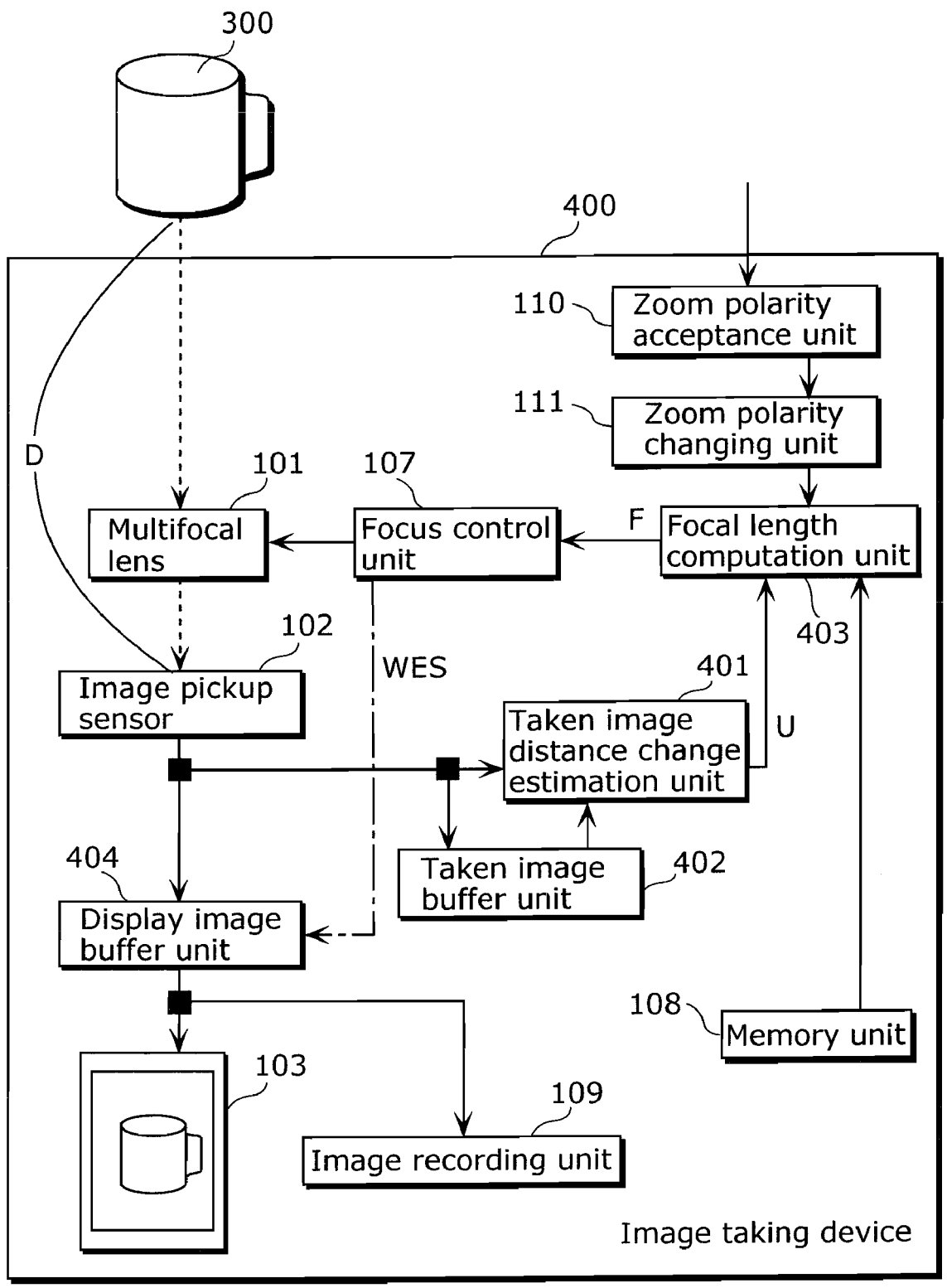
FIG. 13 is a block diagram showing the configuration of an image taking device according to a second embodiment.

FIG. 13 is a block diagram showing the configuration of the image taking device according to the second embodiment of the present invention. The same units as those of the image taking device shown in FIG. 5 are indicated by the same reference numerals and the detailed description for them will not be repeated.

The image taking device 400 is a device for taking an image of a subject 300 characterized by adjusting (zooming) a taken image according to the positional relationship with the subject (the amount of change in image taking distance). The image taking device 400 has a multifocal lens 101, an image pickup sensor 102, a finder 103, an image taking distance change estimation unit 401, a taken image buffer unit 402, a focal length computation unit 403, a display image buffer unit 404, a focus control unit 107, a memory unit 108, an image recording unit 109, a zoom polarity acceptance unit 110, and a zoom polarity selecting unit 111.

The image taking distance change estimation unit 401 estimates an amount of change in the distance between the image taking device 400 and the subject 300 (an amount of change $U_k$ in image taking distance) on the basis of a taken image $I_k$ taken by the image pickup sensor 102 at a time $T_k$ and a taken image $I_{k-1}$ taken by the image pickup sensor 102 at a past time $T_{k-1}$ and temporarily stored in the taken image buffer unit 402.

Figure 14A:
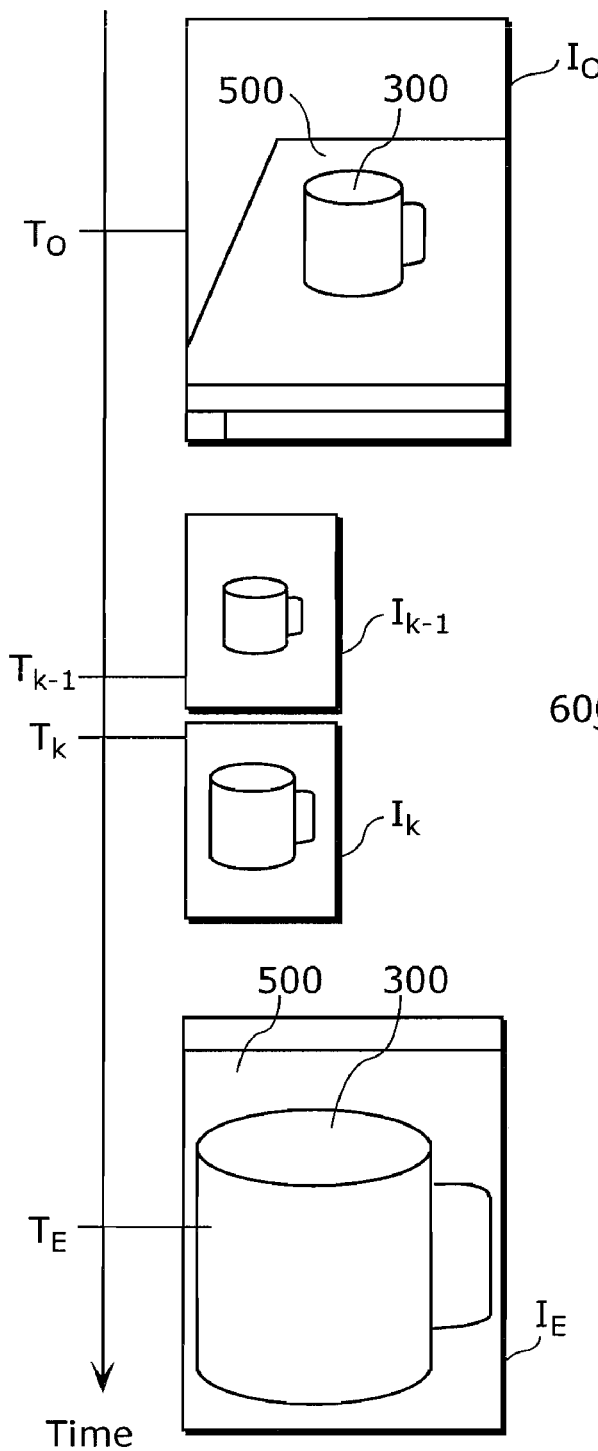
FIGS. 14A and 14B are diagrams for explaining the difference between the sizes of objects with respect to a change in image taking distance.
Figure 14B:
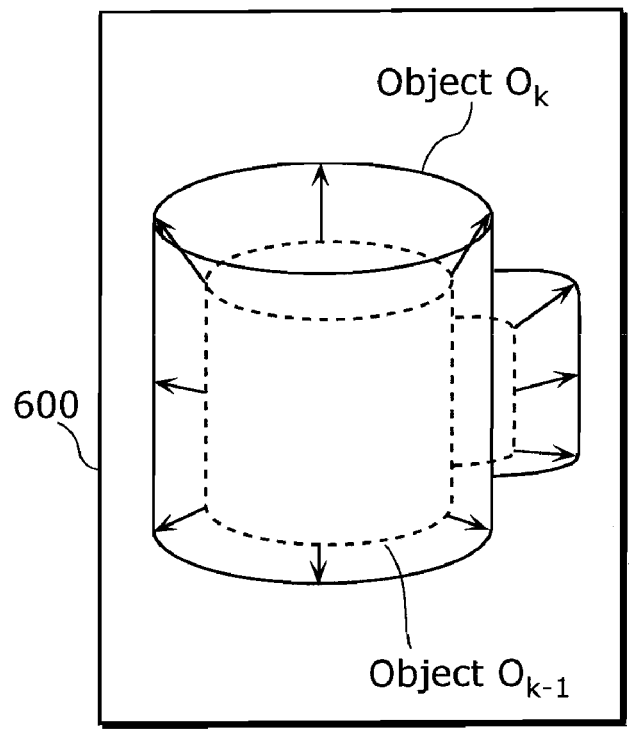

The way in which the amount of change $U_k$ in the image taking distance is obtained will be described with reference to FIGS. 14A and 14B. FIG. 14A shows taken images when the image taking device 400 is brought closer to the subject 300 between a time $T_0$ and a time $T_E$. The subject 300 is placed on a table 500, and a small image of the subject 300, as represented by a taken image $I_0$, is taken at time $T_0$. At time $T_E$, a large image of the subject 300, enlarged as a result of bringing the image taking device 400 close to the subject 300, as represented by a taken image $I_E$, is taken. That is, the view angle is reduced by dollying 1010 shown in FIG. 1 and the image is thereby enlarged. Attention is paid to successive times $T_{k-1}$ and $T_k$ between time $T_0$ and $T_E$ and corresponding images are assumed to be taken images $I_{k-1}$ and $I_k$. The interval between the times $T_{k-1}$ and $T_k$ depends on the frame rate and is ordinarily 1/30 second. An image 600 shown in FIG. 14B is an image which is obtained by superposing the taken images $I_{k-1}$ and $I_k$ on each other, and in which an object $O_{k-1}$ indicated by the broken line corresponds to the taken image $I_{k-1}$ of the subject 300, and an object $O_k$ indicated by the solid line corresponds to the taken image $I_k$ of the subject 300. The object $O_k$ appearing after the object $O_{k-1}$ with respect to time is larger than the object $O_{k-1}$. Therefore, if a judgment is made as to the difference between the objects, the direction of dollying 1010 can be detected to ascertain whether the image taking device 400 is moving closer to or away from the subject 300.

Figure 15A:
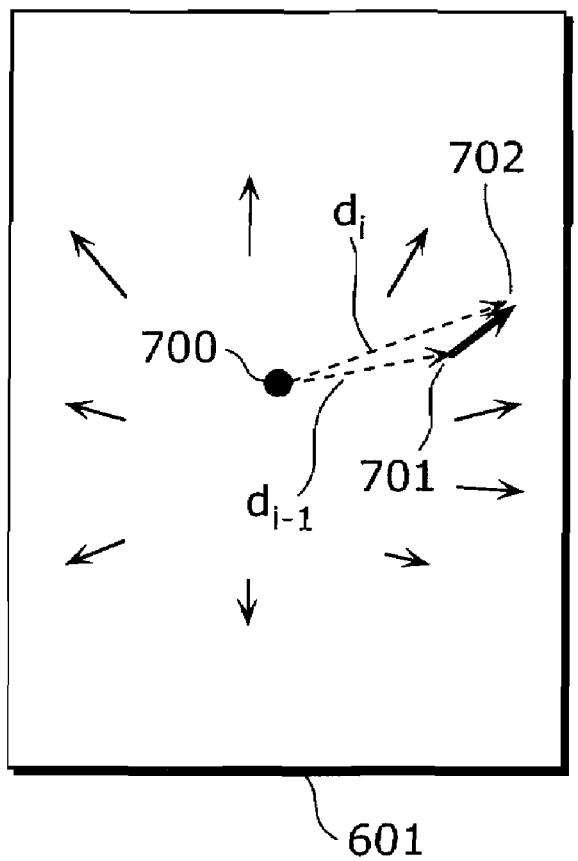
FIGS. 15A and 15B are diagrams for explaining the principle of obtaining the direction of movement of the image taking device by means of optical flows.
Figure 15B:
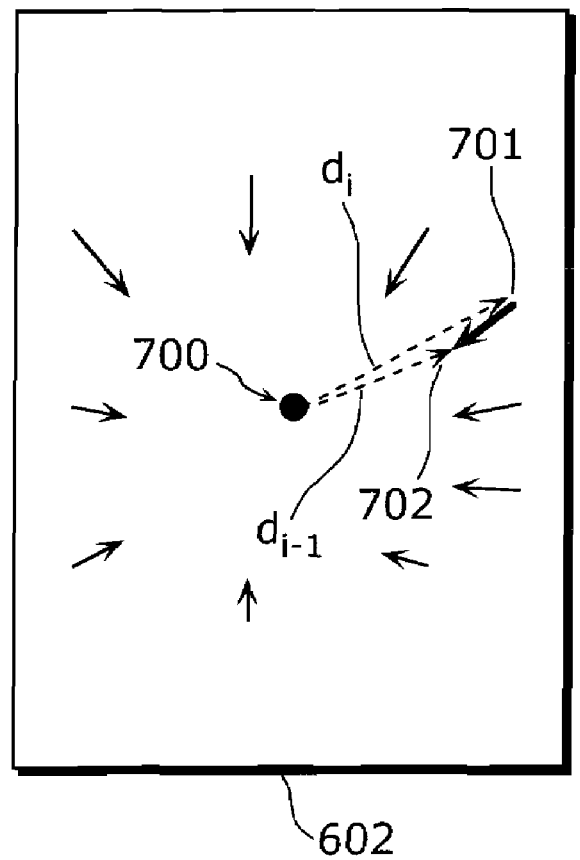

A judgment as to the difference between the objects can be made by analyzing how a plurality of observed points belonging to the objects move on the image. For this analysis, an optical flow is ordinarily obtained. For example, a pixel in an edge portion having a pixel value largely different from that of an adjacent pixel is used as a point to be observed; such points to be observed in the objects $O_{k-1}$ and $O_k$ are obtained; and arrows are drawn in the direction from time $T_{k-1}$ to time $T_k$ between the observed points, as shown in the image 600. In this way, observed points moving with time are tracked on the basis of the pixel values to obtain the movements of the observed points, as in an image 601 shown in FIG. 15A. The movements of observed points (i.e., arrows) thus obtained are called optical flows. In a case where an image is enlarged as in the example shown in FIGS. 14A and 14B, the directions of optical flows are outwardly divergent. In a case where an image is reduced reversely to that in the example shown in FIGS. 14A and 14B, the directions of optical flows are inwardly convergent, as shown in an image 602 in FIG. 15B. For example, a judgment may be made as to the above-described divergence and convergence by obtaining a centroid 700 of all the observed points at time $T_{k-1}$ and comparing the distance $d_{k-1}$ between the centroid 700 and each observed point at time $T_{k-1}$ (701 in FIGS. 15A and 15B) and the distance k between the centroid 700 and the corresponding point in the optical flow at time $T_k$ (702 in FIGS. 15A and 15B). That is,

[Formula 6]

$$\begin{cases} d_{i-1} < d_i & \text{Divergence} \\ d_{i-1} = d_i & \text{Steady state} \\ d_{i-1} > d_i & \text{Convergence} \end{cases} \quad \wedge \text{ (Equation 6)}$$

In ordinary cases, it is difficult to make judgment in an ideal manner due to various causes, e.g., a reduction in accuracy of detection of observed points under the influence of noise and a situation where not all the optical flows are determined in the same direction. Then, binary judgment of whether the image taking device 400 is approaching or moving away from the subject 300 is achieved with stability, when taking a measure as follows: a judgment according to the equation (6) is made with respect to all the observed points; voting is performed on divergent, steady and convergent states; and the state having the largest vote is selected as a judgment result may be taken. Subsequently, only the optical flows coinciding with the judgment result are extracted, the differences between the distance $d_{k-1}$ and the distance $d_k$ are obtained, and the average of these values is used as the amount of change $U_k$ in the observed distance.

Since the optical flows are intended for detection of dollying 1010, there is a need to fix the focal length of the multifocal lens during transition from time $T_{k-1}$ to time $T_k$. Accordingly, the image taking device 400 shown in FIG. 13 operates in accordance with the flowchart shown in FIG. 16. That is, the image pickup sensor 102 takes the image $I_{k-1}$ at time $T_{k-1}$ (step S201) and the taken image $I_{k-1}$ is stored in the taken image buffer unit 402 (step S202). Subsequently, the image pickup sensor 102 takes the image $I_k$ at time $T_k$ (step S203) and the taken image $I_k$ is outputted to the image taking distance change estimation unit 401. Simultaneously, the taken image $I_{k-1}$ is also outputted from the taken image buffer unit 402 to the image taking distance change estimation unit 401 (step S204). The image taking distance change estimation unit 401 computes the amount of movement $U_k$ by computing the optical flows by the method described with reference to FIGS. 15A and 15B (step S205). Computation of the focal length $F_k$ (step S206) and changing the focal length (step S207) are same as steps S106 and S107 of the first embodiment, and the description for them is omitted. Finally, after the completion of changing the focal length of the multifocal lens 101, the focus control unit 107 outputs an image write permission signal WES to the display image buffer unit 404. The display image buffer unit 404 stores the output from the image pickup sensor 102 and outputs the stored image to the finder 103 and to the image recording unit 109. Writing of the output from the image pickup sensor 102 to the display image buffer unit 404 requires making the image write permission signal WES valid. If the image write permission signal WES is not valid, the output from the image pickup sensor 102 cannot be stored in the display image buffer unit 404. This mechanism enables prohibition of output to the finder 103 and the image recording unit 109 of the image having the change in view angle made by dollying 1010 as described with reference to FIGS. 14A and 14B while enabling output to the finder 103 and the image recording unit 109 of only the image having the change in view angle made by the multifocal lens 101, i.e., the image having the change in view angle made by zooming 1014. The focal length control unit 107 does not change the focal length of the multifocal lens 101, unless the amount of movement $U_k$ is changed. Therefore, zooming 1014 is not performed during the time period from time $T_{k-1}$ to time $T_k$ during which optical flow processing is performed in the image taking distance change estimation unit 401, and the amount of movement $U_k$ is determined only by the dollying 1010 movement.

Note that the present invention does not restrictively specify the method of judgment as to the difference in size between objects. Any other method may alternatively be used. For example, a method may be used in which a reference figure having large differences in luminance and color from adjacent pixels is identified and the zoom polarity and the amount of change $U_k$ in the observation distance are computed from changes in position, size, shape, lightness, and color of the reference figure. Another method may be used in which detection of points to be observed, judgment as to the directions of optical flows are performed and the amount of change $U_k$ in the observation distance is obtained from the detected optical flows. These methods are not any limitations on the present invention.

Assumption that time $T_{k-1}$ is a time ⅓ second before time $T_k$ is only an example. The present invention does not restrictively specify the method of setting time $T_{k-1}$. The taken image buffer unit 402, assumed to store only one image at time $T_{k-1}$, may alternatively store a plurality of images in the past.

As described above, the components other than the image taking distance change estimation unit 401, the taken image buffer unit 402, the focal length computation unit 403, and the display image buffer unit 404 are the same as those in the first embodiment, and the functions to be realized by the components are also the same. The advantage of use of the image pickup sensor for measurement of the image taking distance resides in the versatility of the sensor. That is, an ultrasonic sensor or an infrared sensor is used only for distance metering and it is difficult to simultaneously use the ultrasonic or infrared sensor for another purpose. On the other hand, the image pickup sensor is applicable to two uses for image taking and distance metering. Therefore the image pickup sensor can be effectively used in a portable telephone with a camera or the like, of which lightness and compactness are required. Also, the same construction as that of digital still cameras or digital video cameras presently on the market can be used in the present invention without being modified. Therefore, a value in terms of capability of zooming through the movement of the camera can be added without adding any new distance measuring sensor.

Third Embodiment

A third embodiment of the present invention will be described with respect to an image taking device which measures the distance to a subject by means of a distance sensor, controls the image-taking view angle according to the distance and cuts out a portion of a taken image. While the image taking range is changed about the optical axis in adjustment of the image taking view angle, a function for cutting out from an arbitrary position on an image is added to enable frame with a high degree of freedom.

Figure 17:
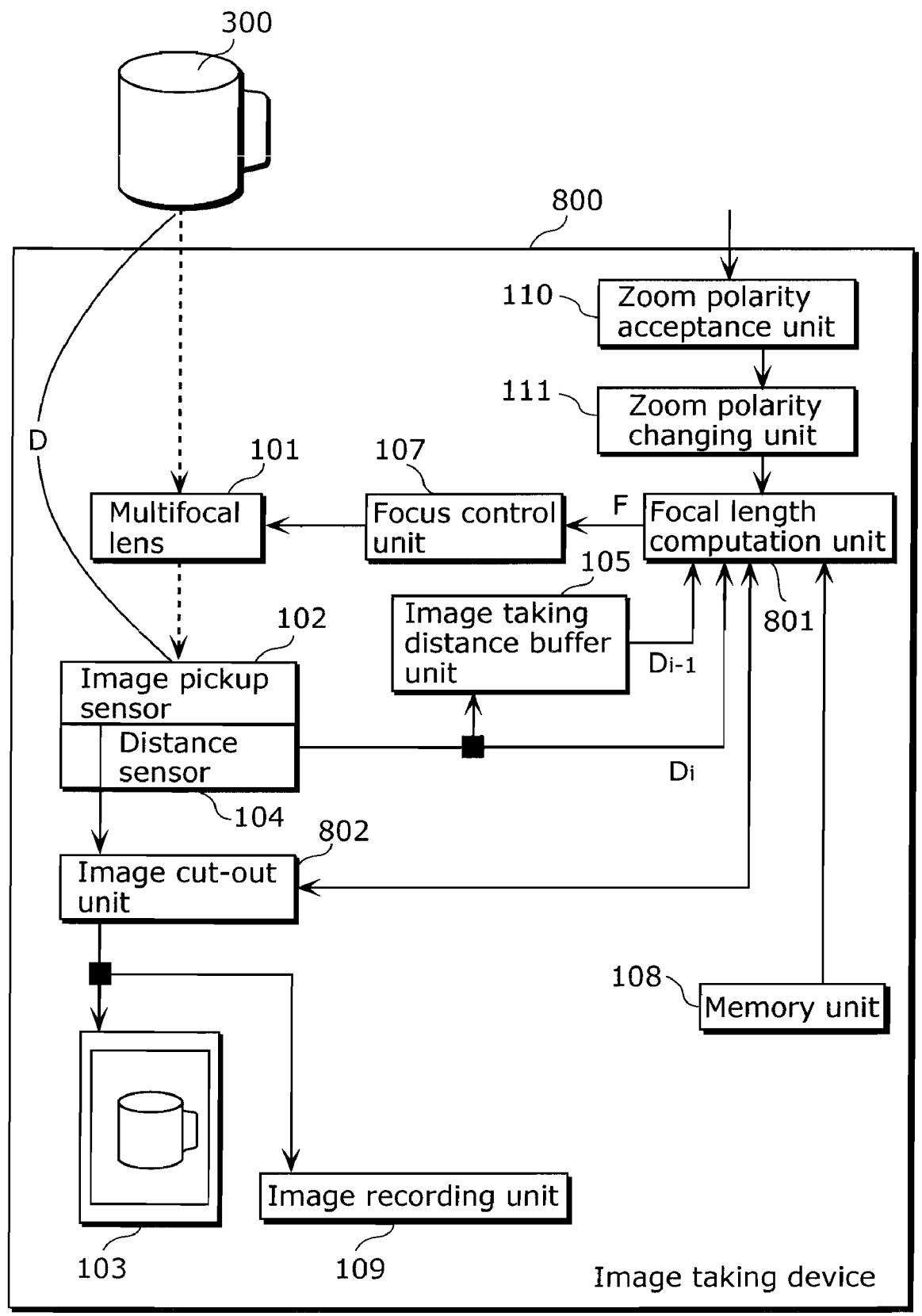
FIG. 17 is a block diagram showing the configuration of an image taking device according to a third embodiment.

FIG. 17 is a block diagram showing the configuration of the image taking device according to the third embodiment of the present invention. The same units as those of the image taking device shown in FIG. 5 are indicated by the same reference numerals and the detailed description for them is omitted.

The image taking device 800 is a device for taking an image of a subject 300 characterized by adjusting a taken image (adjusting the cut-out area) according to the positional relationship with the subject as well as by the feature of the first embodiment. As shown in FIG. 17, the image taking device 800 has a multifocal lens 101, an image pickup sensor 102, a finder 103, a distance sensor 104, a cut-out area computation unit 801, an image cut-out unit 802, a focus control unit 107, a memory unit 108, an image recording unit 109, a zoom polarity acceptance unit 110, and a zoom polarity selecting unit 111.

The cut-out area computation unit 801 computes the cut-out area on the basis of the amount of movement $U_i$ given by equation (1). In this embodiment, the cut-out area computation unit 801 computes the cut-out area on an image having a width w and a height h in terms of number of pixels by designating a ratio γ as shown by the following equation (7):

[Formula 7]

$$(x, y)_{left,top} = \left(\frac{w}{2}\gamma, \frac{h}{2}\gamma\right)$$

$$(x, y)_{right,bottom} = \left(w - \frac{w}{2}\gamma, h - \frac{h}{2}\gamma\right)$$

Λ (Equation 7)

In these equations, $(x, y)_{left,top}$ represents the image coordinates of the left-top vertex of a rectangle representing the cut-out area, and $(x, y)_{right,bottom}$ represents the image coordinates of the right-bottom vertex of the rectangle representing the cut-out area. The ratio γ ranges from 0 to 1. The ratio γ is associated with the amount of relative movement $V_i$, for example, as shown by

[Formula 8]

$$\gamma_1 = \gamma_{i-1} - V_i \quad \text{(Equation 8)}$$

$$\gamma_1 = \gamma_{i-1} + V_i \quad \text{(Equation 9)}$$

Figure 18A:
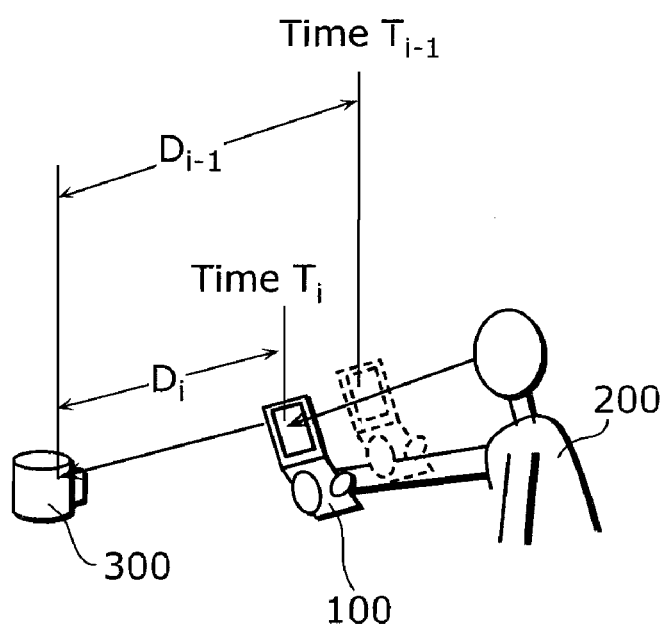
FIGS. 18A to 18D are diagrams for explaining the relationship between changes in the image taking distance and changes in the cut-out area on the basis of equation (10).
Figure 18B:
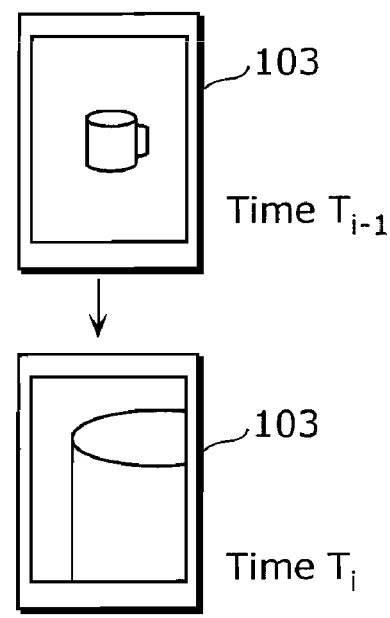
Figure 18C:
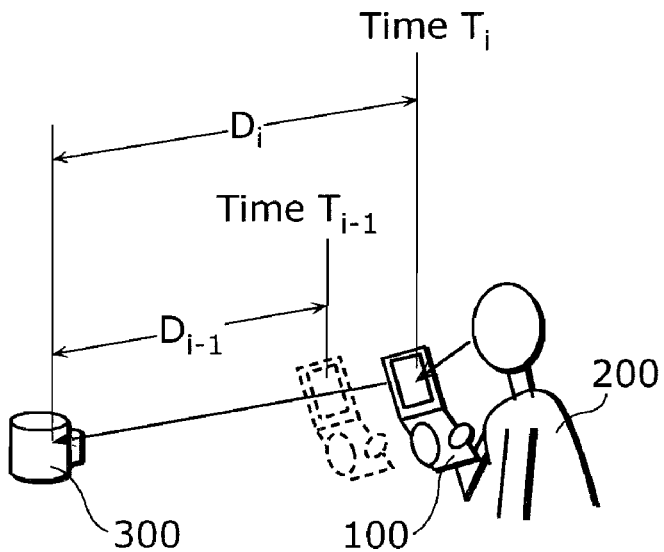
Figure 18D:
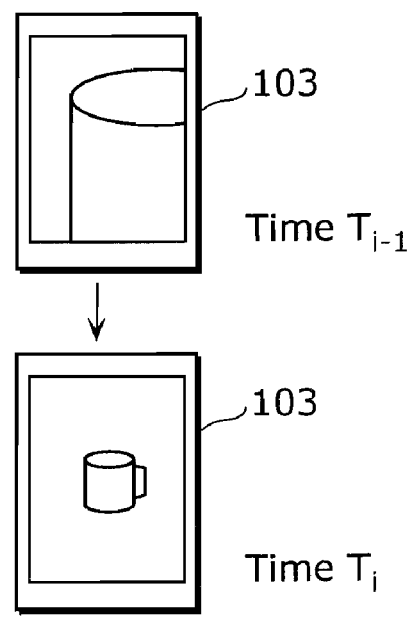

According to equation (8), the image taking device 800 functions so as to increase the cut-out area as shown in FIG. 18B when brought closer to the subject 300 as shown in FIG. 18A. That is, with the progress of time from time $T_{i-1}$ to time $T_i$, the image taking distance D becomes shorter (image taking distance $D_{i-1}$>image taking distance $D_i$) and the amount of relative movement $V_i$ becomes negative according to equation (3). When the amount of relative movement $V_i$ in equation (8) is negative, the ratio γ increases and the cut-out area is increased. Also, according to equation (8), the image taking device 800 functions so as to reduce the cut-out area as shown in FIG. 18D when moved away from the subject 300 as shown in FIG. 18C. With the progress of time from time $T_{i-1}$ to time $T_i$, the image taking distance D becomes longer (image taking distance $D_{i-1}$<image taking distance $D_i$) and the amount of relative movement $V_i$ becomes positive according to equation (3). When the amount of relative movement $V_i$ in equation (8) is positive, the ratio γ decreases and the cut-out area is reduced.

Figure 19A:
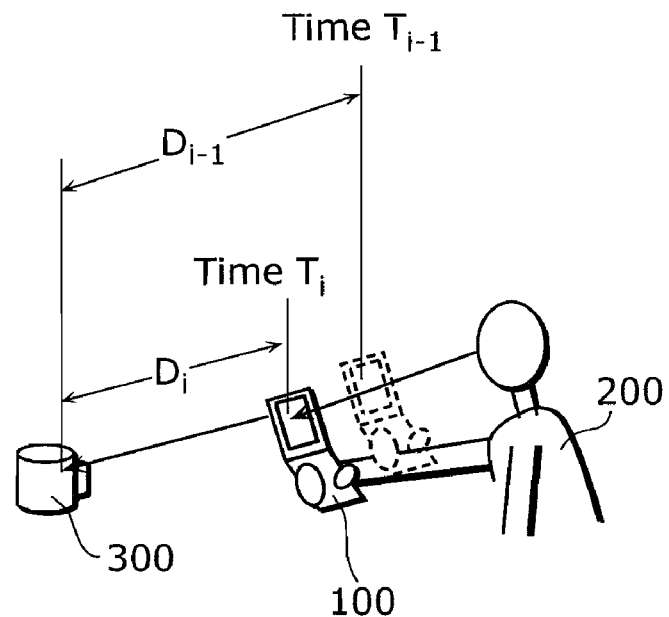
FIGS. 19A to 19D are diagrams for explaining the relationship between changes in the image taking distance and changes in the cut-out area on the basis of equation (11).
Figure 19B:
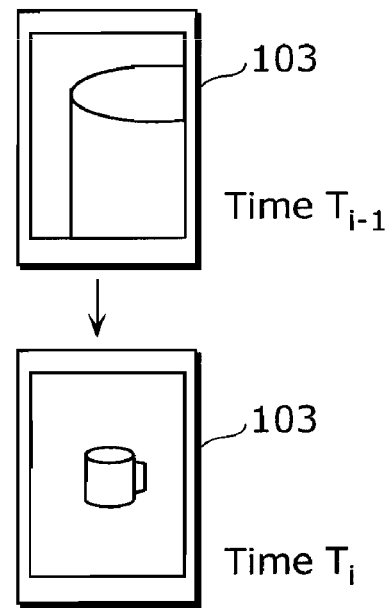
Figure 19C:
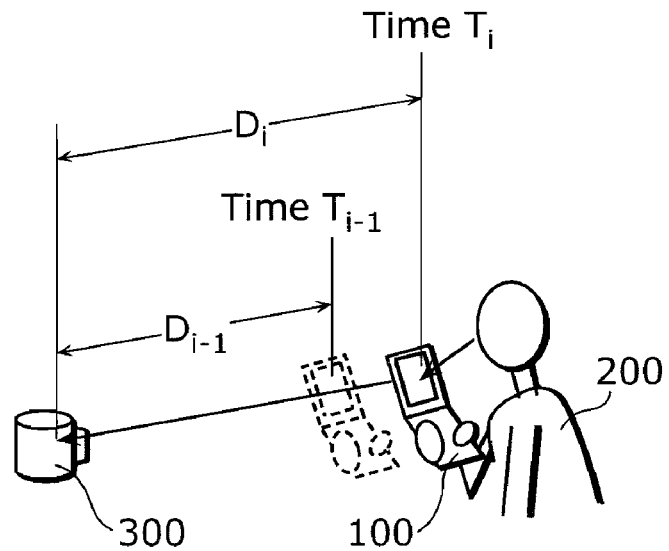
Figure 19D:
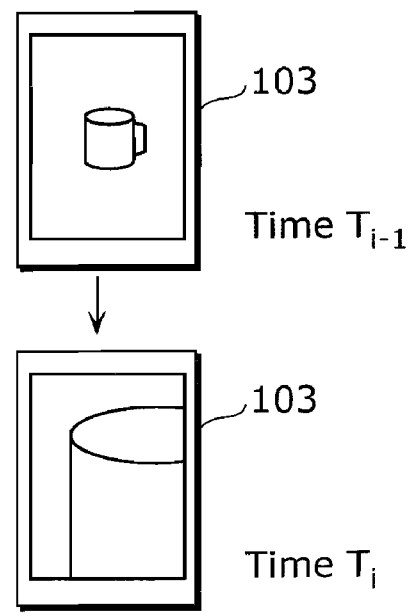

According to equation (9), the image taking device 800 functions so as to reduce the cut-out area as shown in FIG. 19B when brought closer to the subject 300 as shown in FIG. 19A. That is, with the progress of time from time $T_{i-1}$ to time $T_i$, the image taking distance D becomes shorter (image taking distance $D_{i-1}$>image taking distance $D_i$) and the amount of relative movement $V_i$ becomes negative according to equation (3). When the amount of relative movement $V_i$ in equation (9) is negative, the ratio γ decreases and the cut-out area is reduced. Also, according to equation (9), the image taking device 800 functions so as to increase the cut-out area as shown in FIG. 19D when moved away from the subject 300 as shown in FIG. 19C. With the progress of time from time $T_{i-1}$ to time $T_i$, the image taking distance D becomes longer (image taking distance $D_{i-1}$<image taking distance $D_i$) and the amount of relative movement $V_i$ becomes positive according to equation (3). When the amount of relative movement $V_i$ in equation (9) is positive, the ratio γ increases and the cut-out area is increased.

The image cut-out unit 802 cuts out a portion of the image of the subject 300 taken by the subject image pickup sensor 102 through the multifocal lens 101 in correspondence with the cut-out area computed by the cut-out area computation unit 801, and outputs the cut-out image to the finder 103 and the image recording unit 108.

The above-described arrangement enables the focal length of the multifocal lens 101 to be changed with the change in the image taking distance D when the cameraperson 200 moves the image taking device 800 by holding the device in his/her hand. Thus, the same configuration and functions as those in the first embodiment are provided. Further, in the present embodiment, the cut-out area computation unit 801 for computing the cut-out area on the image taken by the image pickup sensor 102 according to the amount of change in the image taking distance D. Therefore the cut-out area can be controlled in a linked relationship with the amount of change in the image taking distance D.

With respect to the position of the cut-out area computed by the cut-out area computation unit 801, the image coordinates of the left-top vertex and the right-bottom vertex shown by the equation (7) may be shifted by the predetermined amount. Thus, the cameraperson 200 can visually check framing including the view angle and the cut-out area by using the finder 103.

Thus, framing for cutting out an image at an arbitrary position is incorporated in the operation of moving the image taking device in addition to zooming by which the image taking range is changed about the optical axis. The present invention does not restrictively specify the functions of the image cut-out unit 802. Accordingly, any image may be cut out and cutting-out may be executed when a taken image recorded in the image recording unit 109 is reproduced and displayed on the display.

In the present embodiment, adjustment of the taken image cut-out area is performed while the focal length is being adjusted according to the distance to the subject. However, according to the present invention, it is not necessarily required that both the focal length and the cut-out area be controlled. That is, the image taking device in accordance with the present invention may only have the function to adjust the area from which a portion of the taken image is cut out according to the distance to the subject. Only by this function, the cameraperson can determine the view angle of the image taking device only through the movement of the image taking device, thus making the image taking operation intuitive and easy to perform. "Adjustment of the focal length" in the first and second embodiments may be replaced with "adjustment of the cut-out area" to make various adjustment methods conceivable with respect to details of the method of adjusting the cut-out area.

Fourth Embodiment

A fourth embodiment of the present invention will be described with respect to an image taking device capable of adjustment of the sensitivity of change of the view angle by a cameraperson in addition to the effects of the first embodiment.

Figure 20:
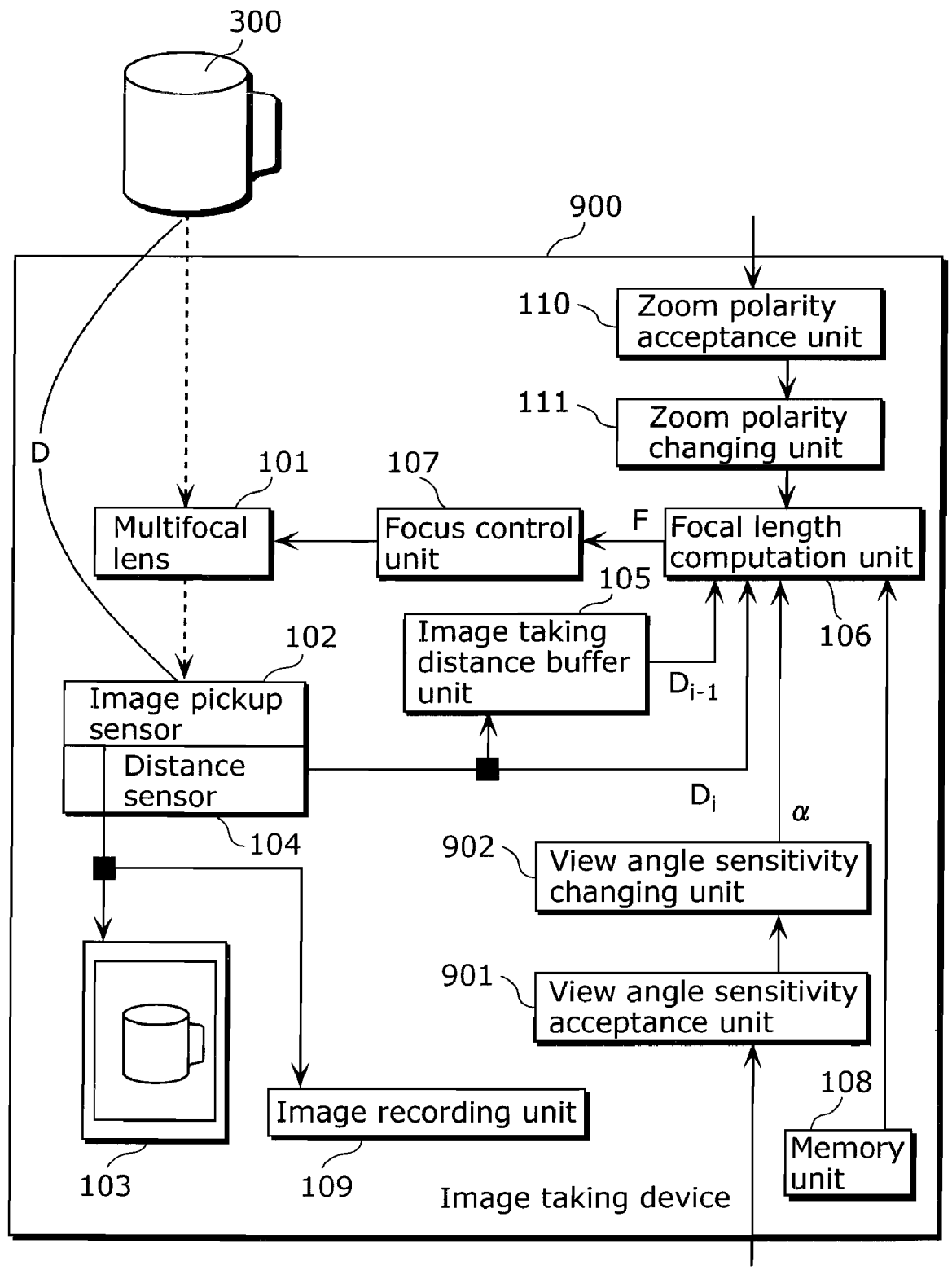
FIG. 20 is a block diagram showing the configuration of an image taking device according to a fourth embodiment.

FIG. 20 is a block diagram showing the configuration of the image taking device according to the fourth embodiment of the present invention. The same units as those of the image taking device shown in FIG. 5 are indicated by the same reference numerals and the detailed description for them is omitted.

The image taking device 900 is a device for taking an image of a subject 300 characterized by capability of adjusting the sensitivity at the time of adjusting (zooming) a taken image according to the positional relationship with the subject (the distance to the subject). The image taking device 900 has a multifocal lens 101, an image pickup sensor 102, a finder 103, a distance sensor 104, an image taking distance buffer unit 105, a focal length computation unit 106, a focus control unit 107, a memory unit 108, an image recording unit 109, a zoom polarity acceptance unit 110, a zoom polarity selecting unit 111, a view angle sensitivity acceptance unit 901, and a view angle sensitivity changing unit 902.

The view angle sensitivity acceptance unit 901 accepts from a cameraperson an amount of change in view angle (view angle sensitivity α) with respect to the amount of relative movement $V_i$. The view angle sensitivity changing unit 902 selects the view angle sensitivity α accepted by the view angle sensitivity acceptance unit 901 and supplies the view angle sensitivity α to the focal length computation unit 106. While the entire variable range of the focal length of the multifocal lens is set in correspondence with the amount of movement $D_A - D_B$ in the case shown in FIG. 8, a situation is also conceivable in which framing according to a certain cameraperson's idea requires setting part of the variable range of the focal length (e.g., from 66 to 150 mm) in correspondence with the amount of movement $D_A - D_B$. When in such a situation the rate of change of the view angle of the image displayed on the finder 103 is excessively high, view angle sensitivity α is reduced to reduce the rate of change of the view angle with respect to the amount of movement $D_A - D_B$. More specifically, the amount of relative movement $V_i$ is multiplied by the view angle sensitivity α, as shown in the following equations (10) and (11):

[Formula 9]

$$F_i = F_{i-1} - \alpha_i V_i (F_{max} - F_{min}) \quad \text{(Equation 10)}$$

$$F_i = F_{i-1} + \alpha_i V_i (F_{max} - F_{min}) \quad \text{(Equation 11)}$$

If the view angle sensitivity α is reduced when the amount of relative movement $V_i$ is fixed, the amount of change from the focal length $F_{i-1}$ to the focal length $F_i$ is reduced to limit the amount of change in view angle. A case is also conceivable in which after the view angle sensitivity α has been reduced, the cameraperson's framing idea is changed and a need arises to again increase the rate of change of the view angle. In a case where the rate of change of the view angle of the image displayed on the finder 103 is not sufficiently high, therefore, the view angle sensitivity α is increased to increase the rate of change of the view angle with respect to the amount of movement $D_A - D_B$. However, the focal length cannot be set so as to exceed the movable range of the multifocal lens 101. In a case where the movable range is exceeded, the focal length is clipped at the minimum or the maximum in the movable range. The same also applies to a case of using electronic digital zoom based on image processing.

Figure 21:
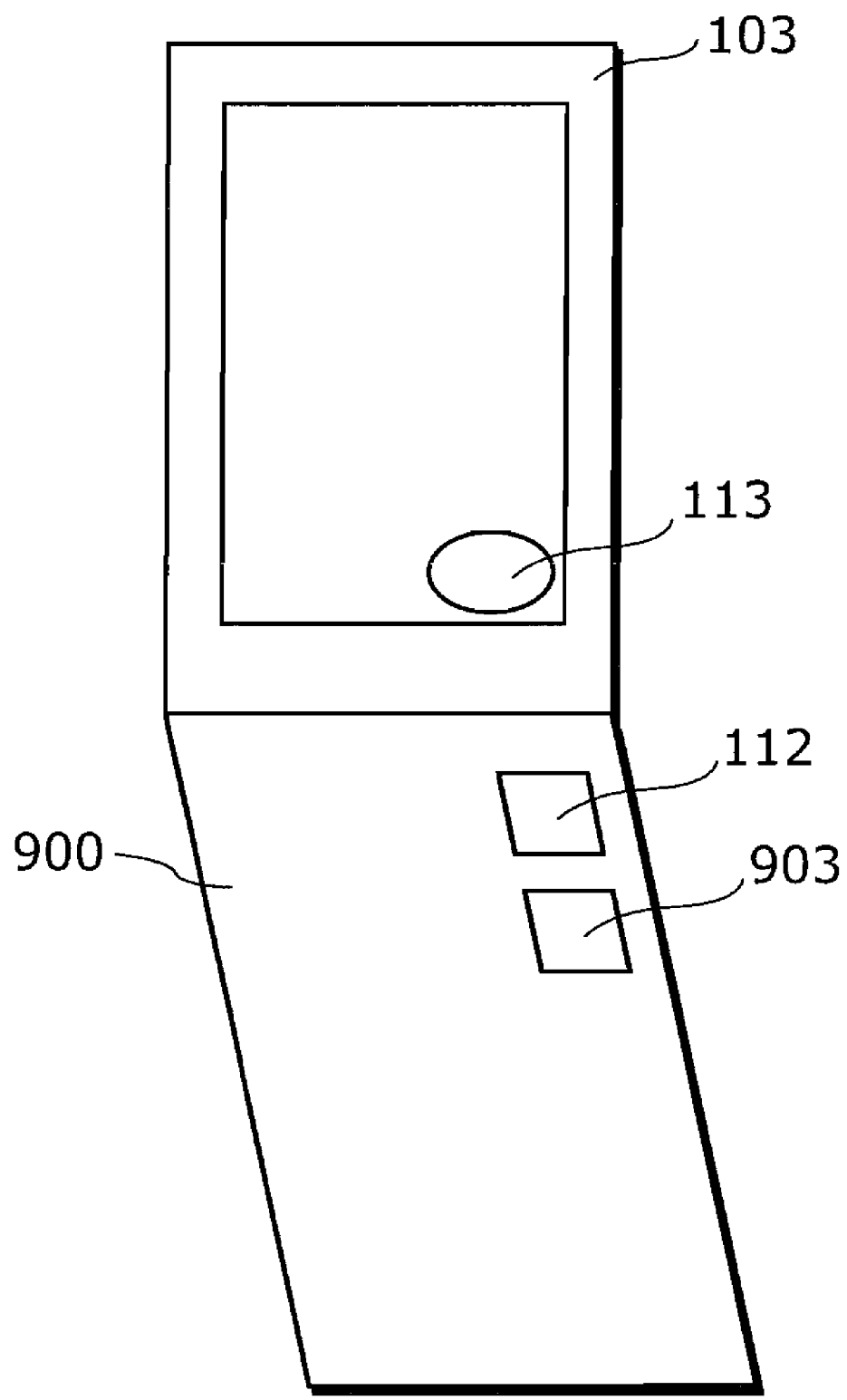
FIG. 21 is a diagram for explaining a view angle sensitivity input button.

FIG. 21 is a diagram showing an example of a view angle sensitivity input button 903 provided on the image taking device 900. For example, the cameraperson 200 can increase the view angle sensitivity α from 1 to 1.5, and 2 stepwise or reduce the view angle sensitivity α from 1 to 0.5, 0.25 and, 0.125 stepwise by pressing the view angle sensitivity input button 903. Selection between the direction of increasing the sensitivity and the direction of reducing the sensitivity is enabled, for example, by adding the corresponding function to the zoom polarity selection button 112. Immediately after the view angle sensitivity input button 902 has been pressed, the zoom polarity selection button 112 functions for selecting from the increasing and reducing directions of the view angle sensitivity α.

An example of details of the view angle sensitivity changing unit 902 will be described with reference to FIGS. 22 and 23.

Figure 22:
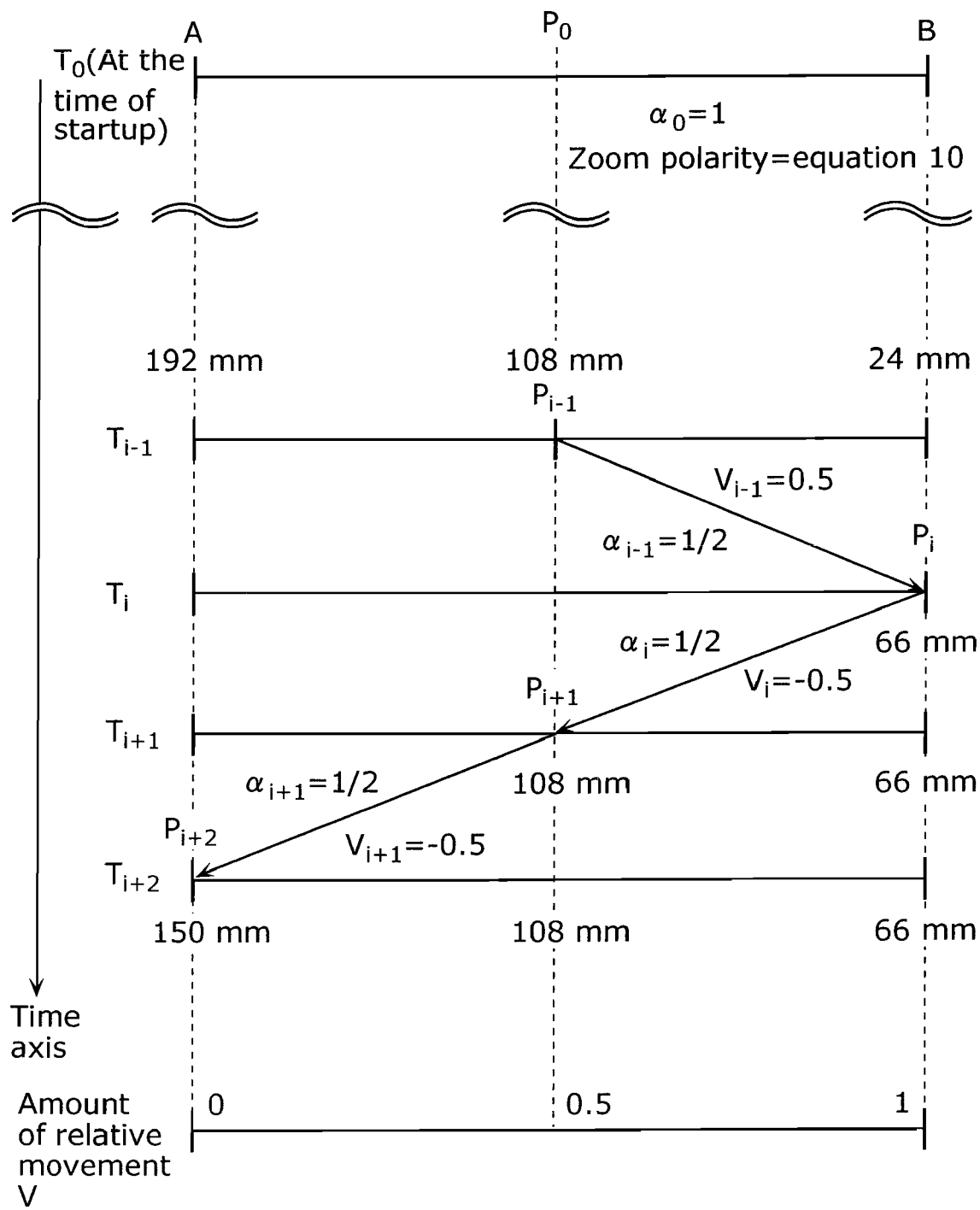
FIG. 22 is a diagram showing an example of changes in focal length when view angle sensitivity α is changed.

FIG. 22 shows an example of changes in focal length when the view angle sensitivity α is changed. At the startup time $T_0$, the focal length is set to 192 mm at the position A and to 24 mm at the position B, as in the case shown in FIG. 9. At time $T_0$, the image taking device 900 is started, with the view angle sensitivity α set to 1 and the zoom polarity set according to equation (10). At this point in time, the arm stretch/fold range (between the positions A and B) and the variable range of the focal length (24 to 192 mm) coincide with each other, as in the case shown in FIG. 9. Thereafter, the view angle sensitivity α is set to 1 before time $T_{i-1}$. At time $T_{i-1}$, the image taking device 900 is located at a position $P_{i-1}$ corresponding to the middle point between the positions A and B. At this position, the view angle sensitivity $\alpha_{i-1}$ is set to ½ and the sensitivity of change of the focal length is reduced to half. The amount of relative movement $V_{i-1}$ is 0.5. The image taking device 900 reaches a position $P_i$ at time $T_i$, and the focal length $F_i$ becomes 66 mm according to equation (10). Next, the image taking device 900 reaches a position $P_{i+1}$ at time $T_{i+1}$, the amount of relative movement $V_i$ is changed to −0.5, and the focal length is returned to 108 mm according to equation (10). Subsequently, the image taking device 900 reaches a position $P_{i+2}$ at time $T_{i+2}$, the amount of relative movement $V_{i+1}$ is set to −0.5, and the focal length is set to 150 mm according to equation (10). As described above, when the view angle sensitivity α is set to ½, the focal length is controlled in the 84 mm range between 66 mm and 150 mm in the variable range in which the focal length is changed by arm stretching/folding, and the range is half that when the view angle sensitivity α is 1 (168 mm range=192 mm−24 mm). Thus, when the view angle sensitivity α is set smaller than 1, a finer pitch is set to enable finer focal length control.

Figure 23:
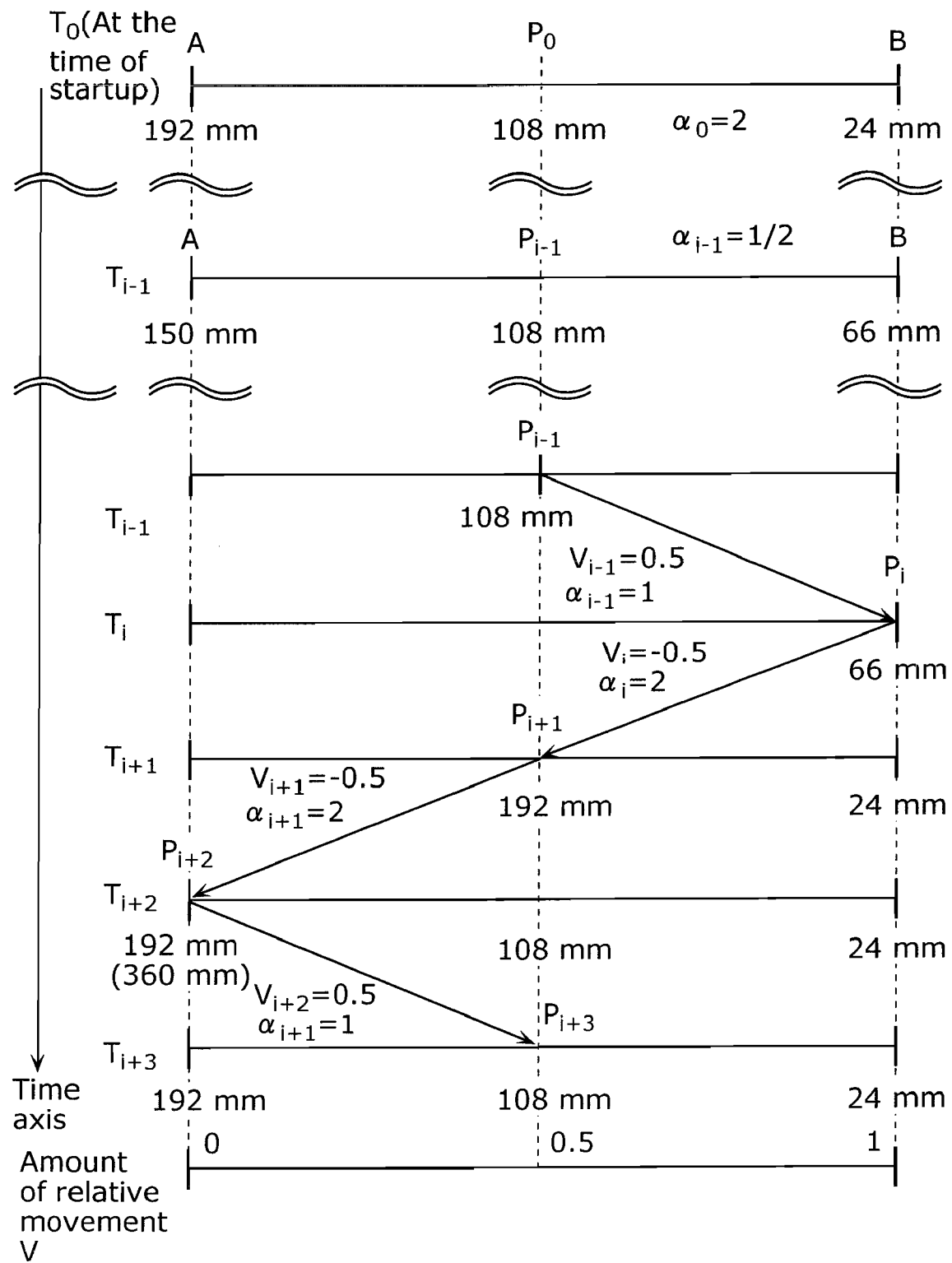
FIG. 23 is a diagram showing an example of changes in focal length when view angle sensitivity α is changed.

FIG. 23 shows an example of changes in focal length when the view angle sensitivity α is changed. At the startup time $T_0$, the focal length is set to 192 mm at the position A and to 24 mm at the position B, as in the case shown in FIG. 9. At time $T_0$, the image taking device 900 is started, with the view angle sensitivity α set to 1 and the zoom polarity set according to equation (10). At this point in time, the arm stretch/fold range (between the positions A and B) and the variable range of the focal length (24 to 192 mm) coincide with each other, as in the case shown in FIG. 9. Thereafter, the view angle sensitivity α is set to ½ before time $T_{i-1}$. At time $T_{i-1}$, the focal length at the position A is set to 150 mm and the focal length at the position B is set to 66 mm in the same way as in the case shown in FIG. 22. Subsequently, the view angle sensitivity α is set to ½, the view angle sensitivity α is set to 1 at time $T_{i-1}$, and the sensitivity of change of the focal length is returned to the same state as that at the time of startup. At time $T_{i-1}$, the image taking device 900 is at position $P_{i-1}$ corresponding to the middle point between the positions A and B. The image taking device 900 reaches position $P_i$ at time $T_i$. The amount of relative movement $V_{i-1}$ is 0.5. The view angle sensitivity $α_{i-1}$ is 1 and the focal length $F_i$ at time $T_i$ is 24 mm according to equation (10), returned to the same value as that at the time of startup. As described above, if the view angle sensitivity α is set less than 1 and is thereafter set to 1, the positional relationship between the image taking device 900 and the focal length is returned to the state at the time of startup.

Next, the view angle sensitivity $α_i$ is set to 2, the image taking device 900 thereafter reaches position $P_{i+1}$ at time $T_{i+1}$, and the amount of relative movement $V_i$ becomes −0.5. The focal length becomes 192 mm according to equation (10). Thus, when the view angle sensitivity α is set larger than 1, the pitch is increased relative to that in the case where the view angle sensitivity α is 1, and the focal length can be largely changed by a small amount of movement.

Subsequently, while the view angle sensitivity $α_{i+1}$ is maintained at 2, the image taking device 900 reaches position $P_{i+2}$ at time $T_{i+2}$, the amount of relative movement $V_{i+1}$ becomes −0.5 and the focal length becomes 360 mm according to equation (10). Since the maximum focal length of the multifocal lens 101 is 192 mm, the focal length computation unit 106 clips the focal length from 360 mm to 192 mm, thereby setting the multifocal lens 101 to 192 mm. Therefore, the focal length is not changed even during the process of time from time $T_{i+1}$ to time $T_{i+2}$, and the view angle of the taken image displayed on the finder 103 is not changed.

Next, the view angle sensitivity $α_{i+2}$ is set to 1, the image taking device 900 thereafter reaches position $P_{i+3}$ at time $T_{i+3}$, and the amount of relative movement $V_{i+2}$ becomes 0.5. The focal length becomes 108 mm according to equation (10). As described above, if the view angle sensitivity α is set to a value exceeding 1; the image taking device 900 is thereafter moved to the end of the movable range through which it can be moved by arm stretching/holding (i.e., to the position A or B); and the view angle sensitivity α is set to 1, the positional relationship between the image taking device 900 and the focal length is returned to the state at the time of startup.

Thus, the relationship between the amount of movement of the image taking device and the amount of change in the focal length can be changed by multiplying the amount of movement of the image taking device by the view angle sensitivity α, and the cameraperson can reduce the view angle sensitivity α to check details of an object while finely changing the view angle. This procedure can be effectively utilized, for example, in checking commodity designs in electronic commerce and appreciating works of art, plants and animals, etc. On the other hand, switching between the entire field of view and object details can be quickly performed by increasing the view angle sensitivity α. Switching between the entire field of view and object details is frequently used in sport image taking for example. That is, in watching a baseball game for example, change from narrow-angle image taking on a pitcher and a batter to wide-angle image taking on a scene including a speculator's place at a moment when the batter hits a ball is usually made. In some cases, the view angle is changed for an improvement in image presentation effect. Adjustment of the view angle sensitivity α is effective, for example, in changing from wide-angle image taking on all members of an orchestra formed by several ten players to narrow-angle image taking on players of a particular part (e.g., a piano player). As described above, change of the view angle sensitivity α may be effectively utilized for maintaining a magnification high enough to enable details to be observed to be recognized with the eyes, and for keeping within the frame a subject moving largely and quickly, as in sport image taking.

In each of the above-described embodiments, the image pickup sensor 102 corresponds to an image pickup unit in the claims; the distance sensor 104 to a distance computation unit in the claims; the focal length computation unit 106 to a focal length computation unit in the claims; and the focus control unit 107 to a focal length control unit in the claims, respectively. Also, the image taking distance change estimation unit 401 and taken image buffer unit 402 correspond to a distance computation unit in the claims. Further, the cut-out area computation unit 801 corresponds to a cut-out area computation unit in the claims, and the image cut-out unit 802 corresponds to an image cut-out unit in the claims, respectively. Also, the view angle sensitivity changing unit 902 corresponds to a focal length control unit in the claims.

INDUSTRIAL APPLICABILITY

The image taking device, the image taking method and the program according to the present invention enables a cameraperson to control the focal length by moving the image pickup device, therefore makes it possible to determine the image taking view angle only through the movement of the image taking device, and is useful, for example, in an application to a digital camera, a still camera, a video camera, a portable telephone with a camera, or the like.

The invention claimed is:

1. An image taking device which adjusts a taken image according to a positional relationship with a subject, said image taking device comprising:

an image taking unit operable to take an image of the subject by using a multifocal lens;

a distance computation unit operable to (i) compute a difference between a size of an object at a predetermined time and a size of the object at a present time, by determining an optical flow indicating a movement of an observed point that belongs to the object, the object being contained in the image taken by said image taking unit, and (ii) compute an amount of change of a distance from said image taking device to the subject based on the computed difference between the sizes of the object;

a focal length computation unit operable to compute a focal length of the multifocal lens based on the amount of the change of the distance to the subject; and a focal length control unit operable to control a focal length of the multifocal lens so that the focal length of the multifocal lens is adjusted to the focal length computed by the focal length computation unit, wherein said distance computation unit is operable to (i) judge which state among states including divergent, steady and convergent represents each optical flow of a plurality of optical flows, by judging, for the optical flows, increasing or decreasing of a distance from each centroid of a plurality of the observed points to the observed point, the optical flows indicating movements of the plurality of the observed points that belong to the object; (ii) extract, from the judged optical flows, only optical flows that are in a state represented by most optical flows, (iii) determine, for the extracted optical flows, a difference between a distance from the centroid to the observed point at the predetermined time and at the present time, and (iv) compute an average value of the determined differences as the amount of the change.

2. The image taking device according to claim 1, wherein said focal length computation unit is operable to compute the focal length of the multifocal lens so that the focal length is increased, when the amount of the change of the distance indicates that the distance to the subject at the present time is shorter than the distance to the subject at the predetermined time, and to compute the focal length of the multifocal lens so that the focal length is reduced, when the amount of the change of the distance indicates that the distance to the subject at the present time is longer than the distance to the subject at the predetermined time.

3. The image taking device according to claim 1, wherein said focal length computation unit is operable to compute the focal length of the multifocal lens so that the focal length is reduced, when the amount of the change of the distance indicates that the distance to the subject at the present time is shorter than the distance to the subject at the predetermined time, and to compute the focal length of the multifocal lens so that the focal length is increased, when the amount of the change of the distance indicates that the distance to the subject at the present time is longer than the distance to the subject at the predetermined time.

4. The image taking device according to claim 1, wherein said focal length computation unit is operable to weight the amount of the change of the distance to make variable a rate of contribution of (i) the difference between the distances to the subject, and (ii) an amount of change in the focal length of the multifocal lens.

5. A portable terminal device comprising the image taking device according to claim 1, said image taking device taking an image of a subject.

6. An image taking device which adjusts a taken image according to a positional relationship with a subject, said image taking device comprising:

an image taking unit operable to take an image of the subject by using a multifocal lens;

a distance computation unit operable to (i) compute a difference between a size of an object at a predetermined time and a size of the object at a present time, by determining an optical flow indicating a movement of an observed point that belongs to the object, the object being contained in the image taken by said image taking unit, and (ii) compute an amount of change of a distance from said image taking device to the subject based on the computed difference between the sizes of the object;

a cut-out area computation unit operable to compute an image area to be cut out of the taken image based on the amount of the change of the distance to the subject; and an image cut-out unit operable to cut out a portion of the taken image according to a result of the computation by said cut-out area computation unit, wherein said distance computation unit is operable to (i) judge which state among states including divergent, steady and convergent represents each of the optical flow of a plurality of optical flows, by judging, for the optical flows, increasing or decreasing of a distance from each centroid of a plurality of the observed points to the observed point, the optical flows indicating movements of the plurality of the observed points that belong to the object; (ii) extract, from the judged optical flows, only optical flows that are in a state represented by most optical flows, (iii) determine, for the extracted optical flows, a difference between a distance from the centroid to the observed point at the predetermined time and at the present time, and (iv) compute an average value of the determined differences as the amount of the change.

7. The image taking device according to claim 6, wherein said cut-out area computation unit is operable to compute the cut-out image area on the taken image so that the image area is reduced, when the amount of the change of the distance indicates that the distance to the subject at the present time is shorter than the distance to the subject at the predetermined time, and to compute the cut-out image area on the taken image so that the image area is increased, when the amount of the change of the distance indicates that the distance to the subject at the present time is longer than the distance to the subject at the predetermined time.

8. The image taking device according to claim 6, wherein said cut-out area computation unit is operable to compute the cut-out image area on the taken image so that the image area is increased, when the amount of the change of the distance indicates that the distance to the subject at the present time is shorter than the distance to the subject at the predetermined time, and to compute the cut-out image area on the taken image so that the image area is reduced, when the amount of the change of the distance indicates that the distance to the subject at the present time is longer than the distance to the subject at the predetermined time.

9. The image taking device according to claim 6, wherein said cut-out area computation unit is operable to weight the amount of the change of the distance and the distance to the subject at the present time to make variable a rate of contribution of (i) the difference between the distances to the subject, and (ii) an amount of change in the image area to be cut out of the taken image.

10. An image taking method of adjusting a taken image according to a positional relationship between an image taking device and a subject, said method comprising:

an image taking step of taking an image of the subject by using a multifocal lens;

a distance computation step of (i) computing a difference between a size of an object at a predetermined time and a size of the object at a present time, by determining an optical flow indicating a movement of an observed point that belongs to the object, the object being contained in the image taken in said image taking step, and (ii) computing an amount of change of a distance from the image taking device to the subject based on the computed difference between the sizes of the object;
a focal length computing step of computing the focal length of the multifocal lens based on the amount of the change of the distance to the subject; and
a focal length control step of controlling the focal length of the multifocal lens so that the focal length of the multifocal lens is adjusted to the focal length computed by said focal length computation step,
wherein said distance computation step includes (i) judging which state among states including divergent, steady and convergent represents each optical flow of a plurality of optical flows, by judging, for the optical flows, increasing or decreasing of a distance from each centroid of a plurality of the observed points to the observed point, the optical flows indicating movements of the plurality of the observed points that belong to the object; (ii) extracting, from the judged optical flows, only optical flows that are in a state represented by most optical flows, (iii) determining, for the extracted optical flows, a difference between a distance from the centroid to the observed point at the predetermined time and at the present time, and (iv) computing an average value of the determined differences as the amount of the change.

11. A program stored on a computer-readable medium for taking an image of a subject, said program causing a computer to execute the steps of the image taking method according to claim 10.

12. An image taking device which adjusts a taken image according to a positional relationship with a subject, said image taking device comprising:
an image taking unit operable to take an image of the subject by using a multifocal lens;
a distance computation unit operable to extract a reference figure contained in the image taken by said image taking unit, and compute a distance from said image taking device to the subject based on a difference between the reference figure at a predetermined time and the reference figure at a present time;
a focal length computation unit operable to compute a focal length of the multifocal lens based on the distance to the subject; and
a focal length control unit operable to control a focal length of the multifocal lens so that the focal length of the multifocal lens is adjusted to the focal length computed by said focal length computation unit,
wherein said focal length computation unit is operable to weight a difference between the distance to the subject at the predetermined time and the distance to the subject at the present time to make variable a rate of contribution of (i) the difference between the distances to the subject, and (ii) an amount of change in the focal length of the multifocal lens.

13. An image taking method of adjusting by an image taking device a taken image according to a positional relationship with a subject, said image taking method comprising:
taking an image of the subject by using a multifocal lens;
extracting a reference figure contained in the image taken, and computing a distance from the image taking device to the subject based on a difference between the reference figure at a predetermined time and the reference figure at a present time;
computing a focal length of the multifocal lens based on the distance to the subject; and
controlling a focal length of the multifocal lens so that the focal length of the multifocal lens is adjusted to the focal length computed,
wherein said computing of the focal length includes weighting a difference between the distance to the subject at the predetermined time and the distance to the subject at the present time to make variable a rate of contribution of (i) the difference between the distances to the subject, and (ii) an amount of change in the focal length of the multifocal lens.

14. A program product that is embodied on a computer-readable recording medium and used for an image taking device which adjusts a taken image according to a positional relationship with a subject, said program product causing a computer to execute:
taking an image of the subject by using a multifocal lens;
extracting a reference figure contained in the image taken, and computing distance from the image taking device to the subject based on a difference between the reference figure at a predetermined time and the reference figure at a present time;
computing a focal length of the multifocal lens based on the distance to the subject; and
controlling a focal length of the multifocal lens so that the focal length of the multifocal lens is adjusted to the focal length computed,
wherein said computing of the focal length includes weighting a difference between the distance to the subject at the predetermined time and the distance to the subject at the present time to make variable a rate of contribution of (i) the difference between the distances to the subject, and (ii) an amount of change in the focal length of the multifocal lens.

15. An image taking device which adjusts a taken image according to a positional relationship with a subject, said image taking device comprising:
an image taking unit operable to take an image of the subject by using a multifocal lens;
a distance computation unit operable to extract a reference figure contained in the image taken by said image taking unit, and compute a distance from said image taking device to the subject based on a difference between the reference figure at a predetermined time and the reference figure at a present time;
a cut-out area computation unit operable to compute an image area to be cut out of the taken image based on the distance to the subject; and
an image cut-out unit operable to cut out a portion of the taken image according to a result of the computation by said cut-out area computation unit,
wherein said cut-out area computation unit is operable to weight a difference between the distance to the subject at the predetermined time and the distance to the subject at the present time to make variable a rate of contribution of (i) the difference between the distances to the subject, and (ii) an amount of change in the image area to be cut out of the taken image.

16. An image taking method of adjusting by an image taking device a taken image according to a positional relationship with a subject, said image taking method comprising:
taking an image of the subject by using a multifocal lens;
extracting a reference figure contained in the image taken, and computing a distance from the image taking device to the subject based on a difference between the reference figure at a predetermined time and the reference figure at a present time;

computing an image area to be cut out of the taken image based on the distance to the subject; and cutting-out a portion of the taken image according to a result of the computation of the image area, wherein said computing of the image area includes weighting a difference between the distance to the subject at the predetermined time and the distance to the subject at the present time to make variable a rate of contribution of (i) the difference between the distances to the subject, and (ii) an amount of change in the image area to be cut out of the taken image.

17. A program product that is embodied on a computer-readable recording medium and used for an image taking device which adjusts a taken image according to a positional relationship with a subject, said program product causing a computer to execute:

taking an image of the subject by using a multifocal lens;

extracting a reference figure contained in the image taken, and computing a distance from the image taking device to the subject based on a difference between the reference figure at a predetermined time and the reference figure at a present time;

computing an image area to be cut out of the taken image on based on the distance to the subject; and cutting-out a portion of the taken image according to a result of the computation of the image area, wherein said computing of the image area includes weighting a difference between the distance to the subject at the predetermined time and the distance to the subject at the present time to make variable a rate of contribution of (i) the difference between the distances to the subject, and (ii) an amount of change in the image area to be cut out of the taken image.

18. An image taking device which adjusts a taken image according to a positional relationship with a subject, said image taking device comprising:

an image taking unit operable to take an image of the subject by using a multifocal lens;

a distance computation unit operable to (i) compute a difference between a size of an object at a predetermined time and a size of the object at a present time, by determining an optical flow indicating a movement of an observed point that belongs to the object, the object being contained in the image taken by said image taking unit, and (ii) compute an amount of change of a distance from said image taking device to the subject based on the computed difference between the sizes of the object;

a focal length computation unit operable to compute a focal length of the multifocal lens based on the amount of the change of the distance to the subject; and a focal length control unit operable to control a focal length of the multifocal lens so that the focal length of the multifocal lens is adjusted to the focal length computed by said focal length computation unit, wherein said distance computation unit is operable to (i) judge which state among states including divergent, steady and convergent represents each optical flow of a plurality of optical flows, by judging, for the optical flows, increasing or decreasing of a distance from each centroid of a plurality of the observed points to the observed point, the optical flows indicating movements of the plurality of the observed points that belong to the object; (ii) extract, from the judged optical flows, only optical flows that are in a state represented by most optical flows, (iii) determine, for the extracted optical flows, a difference between a distance from the centroid to the observed point at the predetermined time and at the present time, and (iv) compute an average value of the determined differences as the amount of the change, and said focal length computation unit is operable to weight the amount of the change of the distance to make variable a rate of contribution of (i) the difference between the distances to the subject, and (ii) an amount of change in the focal length of the multifocal lens.

19. An image taking method of adjusting by an image taking device a taken image according to a positional relationship with a subject, said image taking method comprising:

taking an image of the subject by using a multifocal lens;

computing a difference between a size of an object at a predetermined time and a size of the object at a present time, by determining an optical flow indicating a movement of an observed point that belongs to the object, the object being contained in the image taken, and computing an amount of change of a distance from the image taking device to the subject based on the computed difference between the sizes of the object;

computing a focal length of the multifocal lens based on the amount of the change of the distance to the subject; and controlling a focal length of the multifocal lens so that the focal length of the multifocal lens is adjusted to the focal length computed, wherein said computing of the difference and said computing of the among of the change of the distance includes (i) judging which state among states including divergent, steady and convergent represents each optical flow of a plurality of the optical flows, by judging, for the optical flows, increasing or decreasing of a distance from each centroid of a plurality of the observed points to the observed point, the optical flows indicating movements of the plurality of the observed points that belong to the object; (ii) extracting, from the judged optical flows, only optical flows that are in a state represented by most optical flows, (iii) determining, for the extracted optical flows, a difference between a distance from the centroid to the observed point at the predetermined time and at the present time, and (iv) computing an average value of the determined differences as the amount of the change, and said computing of the focal length includes weighting the amount of the change of the distance to make variable a rate of contribution of (i) the difference between the distances to the subject, and (ii) an amount of change in the focal length of the multifocal lens.

20. A program product that is embodied on a computer-readable recording medium and used for an image taking device which adjusts a taken image according to a positional relationship with a subject, said program product causing a computer to execute:

taking an image of the subject by using a multifocal lens;

computing a difference between a size of an object at a predetermined time and a size of the object at a present time, by determining an optical flow indicating a movement of an observed point belong to the object, the object being contained in the image taken in said taking, and computing an amount of change of a distance from the image taking device to the subject based on the computed difference between the sizes of the object;

computing a focal length of the multifocal lens based on the amount of the change of the distance to the subject; and controlling a focal length of the multifocal lens so that the focal length of the multifocal lens is adjusted to the focal length computed in said computing of the focal length, wherein said computing of the difference and said computing of the among of the change of the distance includes (i) judging which state among states including divergent, steady and convergent represents each optical flow of a plurality of optical flows of the optical flows, by judging, for the optical flows, increasing or decreasing of a distance from each centroid of a plurality of the observed points to the observed point, the optical flows indicating movements of the plurality of the observed points that belong to the object; (ii) extracting, from the judged optical flows, only optical flows that are in a state represented by most optical flows, (iii) determining, for the extracted optical flows, a difference between a distance from the centroid to the observed point at the predetermined time and at the present time, and (iv) computing an average value of the determined differences as the amount of the change, and said computing of the focal length includes weighting the amount of the change of the distance to make variable a rate of contribution of (i) the difference between the distances to the subject, and (ii) an amount of change in the focal length of the multifocal lens.

21. An image taking device which adjusts a taken image according to a positional relationship with a subject, said image taking device comprising:

an image taking unit operable to take an image of the subject by using a multifocal lens;

a distance computation unit operable to (i) compute a difference between a size of an object at a predetermined time and a size of the object at a present time, by determining an optical flow indicating a movement of an observed point that belongs to the object, the object being contained in the image taken by said image taking unit, and (ii) compute an amount of change of a distance from said image taking device to the subject based on the computed difference between the sizes of the object;

a cut-out area computation unit operable to compute an image area to be cut out of the taken image based on the amount of the change of the distance to the subject; and an image cut-out unit operable to cut out a portion of the taken image according to a result of the computation by said cut-out area computation unit, wherein said distance computation unit is operable to (i) judge which state among states including divergent, steady and convergent represents each optical flow of a plurality of the optical flows, by judging, for the optical flows, increasing or decreasing of a distance from each centroid of a plurality of the observed points to the observed point, the optical flows indicating movements of the plurality of the observed points that belong to the object; (ii) extract, from the judged optical flows, only optical flows that are in a state represented by most optical flows, (iii) determine, for the extracted optical flows, a difference between a distance from the centroid to the observed point at the predetermined time and at the present time, and (iv) compute an average value of the determined differences as the amount of the change, and said cut-out area computation unit is operable to weight the amount of the change of the distance to the subject at the present time to make variable a rate of contribution of (i) the difference between the distances to the subject, and (ii) an amount of change in the image area to be cut out of the taken image.

22. An image taking method of adjusting by an image taking device a taken image according to a positional relationship with a subject, said image taking method comprising:

taking an image of the subject by using a multifocal lens;

computing a difference between a size of an object at a predetermined time and a size of the object at a present time, by determining an optical flow indicating a movement of an observed point belong to the object, the object being contained in the image taken, and computing an amount of change of a distance from the image taking device to the subject based on the computed difference between the sizes of the object;

computing an image area to be cut out of the taken image based on the amount of the change of the distance to the subject; and cutting-out a portion of the taken image according to a result of the computation in said computing of the image area, wherein said computing of the difference and said computing of the amount of the change of the distance includes (i) judging which state among states including divergent, steady and convergent represents each optical flow of a plurality of optical flows, by judging, for the optical flows, increasing or decreasing of a distance from each centroid of a plurality of the observed points to the observed point, the optical flows indicating movements of the plurality of the observed points that belong to the object; (ii) extracting, from the judged optical flows, only optical flows that are in a state represented by most optical flows, (iii) determining, for the extracted optical flows, a difference between a distance from the centroid to the observed point at the predetermined time and at the present time, and (iv) computing an average value of the determined differences as the amount of the change, and said computing of the image area includes weighting the amount of the change of the distance to the subject at the present time to make variable a rate of contribution of (i) the difference between the distances to the subject, and (ii) an amount of change in the image area to be cut out of the taken image.

23. A program product that is embodied on a computer-readable recording medium and used for an image taking device which adjusts a taken image according to a positional relationship with a subject, said program product causing a computer to execute:

taking an image of the subject by using a multifocal lens;

computing a difference between a size of an object at a predetermined time and a size of the object at a present time, by determining an optical flow indicating a movement of an observed point belong to the object, the object being contained in the image taken, and computing an amount of change of a distance from the image taking device to the subject based on the computed difference between the sizes of the object;

computing an image area to be cut out of the taken image based on the amount of the change of the distance to the subject; and cutting-out a portion of the taken image according to a result of the computation in said computing of the image area, wherein said computing of the difference and said computing of the amount of the change of the distance includes (i) judging which state among states including divergent, steady and convergent represents each optical flow of a plurality of the optical flows, by judging, for the optical flows, increasing or decreasing of a distance from each centroid of a plurality of the observed points to the observed point, the optical flows indicating movements of the plurality of the observed points that belong to the object; (ii) extracting, from the judged optical flows, only optical flows that are in a state represented by most optical flows, (iii) determining, for the extracted optical flows, a difference between a distance from the centroid to the observed point at the predetermined time and at the present time, and (iv) computing an average value of the determined differences as the amount of the change, and said computing of the image area includes weighting the amount of the change of the distance to the subject at the present time to make variable a rate of contribution of (i) the difference between the distances to the subject, and (ii) an amount of change in the image area to be cut out of the taken image.

* * * * *

UNITED STATES PATENT AND TRADEMARK OFFICE
CERTIFICATE OF CORRECTION

PATENT NO. : 7,609,955 B2 Page 1 of 1
APPLICATION NO. : 11/911069
DATED : October 27, 2009
INVENTOR(S) : Hideto Motomura et al.

It is certified that error appears in the above-identified patent and that said Letters Patent is hereby corrected as shown below:

On the Cover Page,

Item (57) Abstract, line 10 "from the mage" should read --from the image--.

Signed and Sealed this

Fifteenth Day of June, 2010

David J. Kappos
*Director of the United States Patent and Trademark Office*